(12) United States Patent
Shinozaki

(10) Patent No.: US 6,515,387 B1
(45) Date of Patent: Feb. 4, 2003

(54) CONTROLLED MAGNETIC BEARING DEVICE

(75) Inventor: Hiroyuki Shinozaki, Tokyo (JP)

(73) Assignee: Ebara Corporation, Tokyo (JP)

( * ) Notice: Subject to any disclaimer, the term of this patent is extended or adjusted under 35 U.S.C. 154(b) by 0 days.

(21) Appl. No.: 09/647,169

(22) PCT Filed: Jan. 21, 2000

(86) PCT No.: PCT/JP00/00272

§ 371 (c)(1),
(2), (4) Date: Sep. 27, 2000

(87) PCT Pub. No.: WO00/45059

PCT Pub. Date: Aug. 3, 2000

(30) Foreign Application Priority Data

Jan. 27, 1999 (JP) .......... 11-018720
May 25, 1999 (JP) .......... 11-144701

(51) Int. Cl.[7] .............. H02K 7/09
(52) U.S. Cl. .............. 310/90.5
(58) Field of Search ...... 310/90.5, 90, 68 B; 318/607; 324/207.211, 207.212

(56) References Cited

U.S. PATENT DOCUMENTS

| | | | |
|---|---|---|---|
| 4,128,795 A | | 12/1978 | Habermann et al. ........ 318/618 |
| 4,626,754 A | * | 12/1986 | Habermann et al. ....... 310/90.5 |
| 4,795,927 A | * | 1/1989 | Morii et al. ............ 310/90.5 |
| 4,841,212 A | * | 6/1989 | Matsushita et al. ....... 310/90.5 |
| 5,130,589 A | * | 7/1992 | Kanemitsu .............. 310/90.5 |
| 5,142,175 A | * | 8/1992 | Watanabe ............... 310/112 |
| 5,486,729 A | * | 1/1996 | Matsushita et al. ....... 310/90.5 |
| 5,530,306 A | * | 6/1996 | Ueyama ................. 310/90 |
| 5,736,801 A | * | 4/1998 | Murakami .............. 310/90.5 |
| 6,043,580 A | * | 3/2000 | Vogel et al. ............ 310/179 |

FOREIGN PATENT DOCUMENTS

| | | | | |
|---|---|---|---|---|
| EP | 000185765 A1 | * | 7/1984 | |
| EP | 000157693 A1 | * | 3/1985 | |
| EP | 000193609 A1 | * | 9/1986 | |
| EP | 000313727 A1 | * | 5/1989 | .......... F16C/39/06 |
| EP | 000446816 A2 | * | 9/1991 | .......... F16C/09/06 |
| JP | 59-89821 | | 5/1984 | |
| JP | 61-218427 | | 9/1986 | |
| JP | 63-72916 | | 4/1988 | |
| JP | 63-285321 | | 11/1988 | |
| JP | 4-19422 | | 1/1992 | |
| JP | 4-321812 | | 11/1992 | |
| JP | 6-193633 | | 7/1994 | |
| JP | 6-300040 | | 10/1994 | |
| JP | 7-158640 | | 6/1995 | |
| JP | 9-236122 | | 9/1997 | |
| WO | WO 9323683 A1 | * | 11/1993 | .......... F16C/39/06 |
| WO | WO 9523297 A1 | * | 8/1995 | .......... F16C/39/06 |

* cited by examiner

Primary Examiner—Joseph Waks
(74) Attorney, Agent, or Firm—Armstrong, Westerman & Hattori, LLP

(57) ABSTRACT

A controlled magnetic bearing apparatus which generates a control signal based on a sensor signal from a displacement sensor for detecting a radial displacement of a rotor to suppress whirling of the rotor due to an external force synchronized with a rotational movement, and can hence support the rotor stably in a levitated state. A controlled magnetic bearing apparatus including a displacement sensor for detecting a radial displacement of the rotor, a first control unit for calculating a first control signal based on a sensor signal from the displacement sensor and outputting the first control signal, a second control unit disposed in parallel with the first control unit for generating a second control signal changed in phase from the sensor signal inputted therein and outputting the second control signal, a signal synthesizer for adding the second control signal outputted from the second control unit to the first control signal outputted from the first control unit to generate a control signal and outputting the control signal to the power amplifier, a power amplifier for supplying an electric current based on the control signal, and an electromagnet for generating a magnetic force based on a signal from the power amplifier.

11 Claims, 25 Drawing Sheets signal generator from phase adjustor to gain adjustor $$fo = \frac{1}{2\pi CR}$$

F I G. 22A
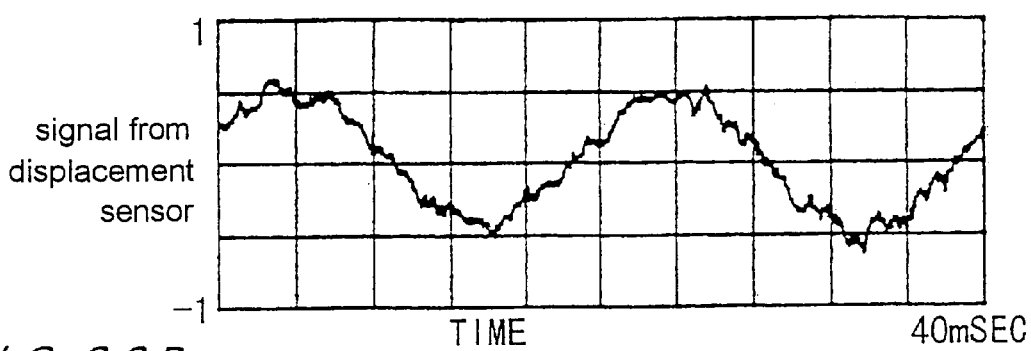
F I G. 22B
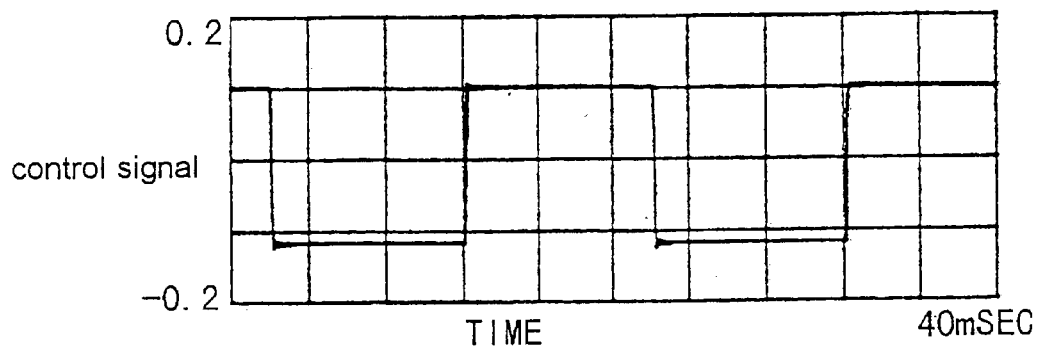

CONTROLLED MAGNETIC BEARING DEVICE

TECHNICAL FIELD

The present invention relates to a controller for a magnetic bearing in an apparatus using the magnetic bearing as a means for supporting a rotor, and more particularly to a controlled magnetic bearing apparatus suitable for suppressing a vibration amplitude in accordance with a whirling movement of an unbalanced rotor.

BACKGROUND ART

FIG. 1 shows a basic configuration of a conventionally typical controlled magnetic bearing apparatus having a feedback control system. For easy understanding, in an illustrated example, a part of a bearing apparatus for radially supporting a rotating shaft 1 has been extracted and is designed to control a vibration amplitude of the rotor 1 in an X-axis direction on an X-Y plane (transverse plane) perpendicular to the rotating shaft 1. Specifically, in FIG. 1, the horizontal axis is taken in an X-axis direction, and the vertical axis in a Y-axis direction, about a center of the rotor 1. Displacement sensors 2a, 2b, and electromagnets 3a, 3b are disposed on the X-axis with interposing the rotor 1 therebetween. An electric current to be supplied to the electromagnets 3a, 3b is controlled based on sensor signals from the displacement sensors 2a, 2b. Electromagnets and displacement sensors are similarly disposed on the Y-axis with interposing the rotor 1 therebetween, and an electric current is controlled in the same manner.

As shown in FIG. 1, the displacement sensors 2a, 2b, which are disposed on the X-axis with interposing the rotor 1 therebetween, and which detect radial displacements of the rotating shaft 1, are connected to a sensor amplifier 4. The displacement sensors 2a, 2b and the sensor amplifier 4 constitute a displacement sensor unit. An output signal from the sensor amplifier 4 is an electric signal (sensor signal) corresponding to a displacement of the rotor 1 in the X-axis direction. The sensor signal is inputted into a first control unit 5 for generating a compensation signal utilized for holding the rotor 1 at a desired levitating position.

The first control unit 5 calculates first control signals based on the sensor signal and outputs the first control signals as control currents. The control signals (control currents) are amplified by power amplifiers 6a, 6b respectively connected to the electromagnets 3a, 3b, and then supplied to coils of the electromagnets 3a, 3b. In each of the electromagnets 3a, 3b, an electromagnetic force is generated by the electric current supplied to each of the coils of the electromagnets 3a, 3b. The rotor 1 is magnetically attracted to the electromagnets 3a, 3b by the electromagnetic forces. Thus, in accordance with a displacement of the rotor 1 in the X-axis direction, the control currents are supplied to a pair of the electromagnets 3a, 3b disposed at an opposite position to each other on the X-axis, and hence the rotor 1 is servo controlled so as to be held in a levitated state at a central position or a target position by the attracting forces of the electromagnets 3a, 3b.

When applications of magnetic bearings become wider, the following problems may arise because of restrictions on their structure, size, and the like:

For example, when a largely unbalanced rotor is rotated while being radially supported by a magnetic bearing, eccentric rotation of the rotor, i.e., whirling, may occur. In such a case, if the degree of eccentricity of the rotor becomes large, then the whirling range of the rotor cannot be within a touchdown gap of the magnetic bearing. Consequently, the rotor cannot be supported in a non-contact levitated state, and this may damage the device.

Further, In the event that a rotor is not levitated at a magnetic center of a motor stator, an external force synchronized with a rotational movement of the motor acts on the rotor. Particularly, in the case of a machine working upon rotation, e.g., a blower, since a load is increased due to an increasing rotational speed, a motor output needs to be increased, and a greater external force synchronized with the rotational movement of the motor acts on the rotor. Consequently, the rotor whirls considerably, and hence a touchdown may occur depending on the degree of the whirling.

Furthermore, when a radial electromagnetic force synchronized with a rotational movement of a motor is generated, a force acting on a rotor as an external force becomes a great load, regardless of a levitating position of the rotor. In this case, as in the aforementioned case, the rotor whirls considerably, and hence a touchdown may occur depending on the degree of the whirling.

In any of the cases, the application of a bearing that can produce a sufficient control power on an external force would solve the problems. However, a stiffness of a magnetic bearing is smaller than that of a rolling bearing or a sliding bearing. Thus, it is difficult for a magnetic bearing to have a stiffness equivalent to that of a rolling bearing or a sliding bearing. For example, when a magnetic flux density of 1 tesla is generated in a space where areas of 1 square centimeter are opposed to each other, an obtained attracting force is about 40 newtons as Maxwell's stress equation shows. With a controlled magnetic bearing, since a magnetic flux density is generally about 0.5 tesla, an attracting force of only about 10 newtons is obtained.

Accordingly, it has recently been attempted to adopt a feed forward control in which an external force synchronized with a rotational movement of a rotor is estimated, and an input with the addition of a control signal for canceling out the estimated external force is inputted into a power amplifier to thus suppress whirling of the rotor. Further, there has been known an open balance control in which a sine wave or a triangular wave signal synchronized with a rotational speed of a rotor is added to a known external force, and the sum is inputted into a power amplifier to thus control whirling of the rotor. These types of control require not only sensor signals from the displacement sensors 2a, 2b disposed with interposing the rotor 1 therebetween as shown in FIG. 1, but also sensor signals from a displacement sensor for detecting displacements of the rotor 1 in the axial direction of the rotor 1, and pulse signals synchronized with the rotational movement of the rotor 1.

DISCLOSURE OF INVENTION

The present invention has been made in view of the above drawbacks. It is therefore an object of the present invention to provide a controlled magnetic bearing apparatus which generates a control signal based on a sensor signal from a displacement sensor for detecting a radial displacement of a rotor to suppress whirling of the rotor due to an external force synchronized with a rotational movement, and can hence support the rotor stably in a levitated state.

A voltage signal proportional to a rotational speed, which is obtained from an existing motor controller, is used either for turning on and off a signal switch before a control signal is inputted into a power amplifier, or for operation of a rotational speed component extraction filter.

According to the present invention, there is provided a controlled magnetic bearing apparatus for radially supporting a rotor, comprising a displacement sensor for detecting a radial displacement of the rotor, a first control unit for calculating a first control signal based on a sensor signal from the displacement sensor and outputting the first control signal, a power amplifier for supplying an electric current based on the first control signal, and an electromagnet for generating a magnetic force based on a signal from the power amplifier, the controlled magnetic bearing apparatus further comprising: a second control unit disposed in parallel with the first control unit for generating a second control signal changed in phase from the sensor signal inputted therein and outputting the second control signal; and a signal synthesizer for adding the second control signal outputted from the second control unit to the first control signal outputted from the first control unit to generate a control signal and outputting the control signal to the power amplifier.

The phase change amount in the second control unit is preferably set at a value suitable for suppressing whirling of the rotor, based on external force/displacement transfer characteristics of a magnetic bearing.

With this arrangement, if the rotor whirls, a signal in response to the whirling emerges in the displacement sensor. Thus, in accordance with this signal, a control force in a direction opposite to an external force acting on the whirling is exerted based on the control characteristics of the magnetic bearing, whereby the whirling can be suppressed. The control force is produced by adjusting the sensor signal to a suitable amount of a phase on the basis of the control characteristics of the magnetic bearing. In particular, a phase change amount based on the external force/displacement transfer characteristics of the magnetic bearing is suitable for suppressing whirling of the rotor. Specifically, a set value of a phase adjustor in the second control unit is determined with reference to transfer characteristics (gain, phase) of the sensor signal from the displacement sensor relative to the input signal of the power amplifier in the conventional servo control. The output signal from the second control unit is added to the output signal from the first control unit. The sum is inputted into the power amplifier unit to control an electric current of the electromagnet, whereby whirling of the rotor can be suppressed.

According to the present invention, the second control unit comprises: a filter for extracting a rotational frequency component from the sensor signal; a phase adjustor for adjusting a phase of an output signal from the filter; a signal generator including a comparator for comparing an output signal from the phase adjustor with a reference electric potential; and a gain adjustor for adjusting an amplitude of an output signal from the signal generator. With this arrangement, amplitude information can be cut off from the sensor signal of the displacement sensor, and only phase information can be obtained. Accordingly, an arbitrary gain can be obtained by changing a desired phase amount. Thus, the control force of the electromagnet suitable for suppressing whirling of the rotor can be obtained. It is preferred to use a rotational speed proportional gain adjustor for giving a gain proportional to a rotational speed as the gain adjustor.

According to the present invention, the second control unit comprises: a variable frequency filter; and means for imparting a phase change amount corresponding to a rotational speed of a motor and suitable for suppressing whirling of the rotor. With this arrangement, a sensor signal corresponding to the rotational speed of the motor is extracted by the variable frequency filter, and a phase change amount suitable for suppressing whirling of the rotor is added to the extracted signal. Accordingly, suitable adjustment of the phase amount for an arbitrary rotational speed can be achieved. Thus, whirling of the rotor can be suppressed at rotational speeds over a wide range.

The means for imparting the phase change amount corresponding to the rotational speed of the motor and suitable for suppressing whirling of the rotor preferably comprises a storage for measuring data on external force/displacement transfer characteristics of the magnetic bearing, and storing the measured data in correspondence with a rotational speed, and a phase adjustor for reading from the storage and adjusting the phase. The phase change amount corresponding to the rotational speed of the motor may be set with use of an arithmetic circuit which approximates the external force/displacement transfer characteristics of the magnetic bearing.

According to the present invention, there is provided a controlled magnetic bearing apparatus further comprising: a signal switch for switching on and off a flow of a signal in the second control unit; and a third control unit for comparing the sensor signal with a reference signal, and turning the signal switch on or off based on results of comparison.

According to the present invention, there is provided a controlled magnetic bearing apparatus further comprising: a signal switch for switching on and off a flow of a signal in the second control unit; and a fourth control unit including a comparator for comparing an actual rotational speed signal with a reference signal, and a signal generator for generating a command signal for turning the signal switch on or off.

According to this arrangement, when the rotor whirls greatly, a whirling movement of the rotor can be suppressed by turning on the signal from the second control unit. When the rotor whirls slightly, an ordinary compensation signal from the first control unit is generated by turning off the signal from the second control unit, and hence the rotor can be kept in a levitated state sufficiently.

A second rotational frequency component extractor is preferably provided at the downstream side of a signal generator including a comparator in the second control unit. According to this arrangement, the output signal from the second control unit can be converted into a low-order sine wave by filtering out a harmonic wave component from a rectangular wave. Thus, troubles such as noises due to harmonic waves can be prevented.

The controlled magnetic bearing apparatus preferably comprises a fifth control unit for comparing the sensor output before the signal switch in the second control unit is turned on, with the sensor output at the time when the signal switch is turned on, and outputting a command value for changing a set value of a gain in the gain adjustor. With this arrangement, when the signal from the second control unit is turned on, a gain of the gain adjustor can be set at an appropriate value. Thus, a gain suitable for suppressing whirling can be obtained.

BRIEF DESCRIPTION OF DRAWINGS

FIG. 18A shows outputs from a displacement sensor and FIG. 18B shows control output signals;

FIG. 19B shows control output signals;

FIG. 20A shows outputs from a displacement sensor and FIG. 20B shows control output signals;

FIG. 21B shows control output signals;

FIGS. 22A and 22B are schematic views showing results of tests of the control unit according to the present invention when a control is turned off, FIG. 22A shows outputs from a displacement sensor and FIG. 22B shows control output signals;

FIG. 23B shows control output signals;

BEST MODE FOR CARRYING OUT THE INVENTION

Figure 1:
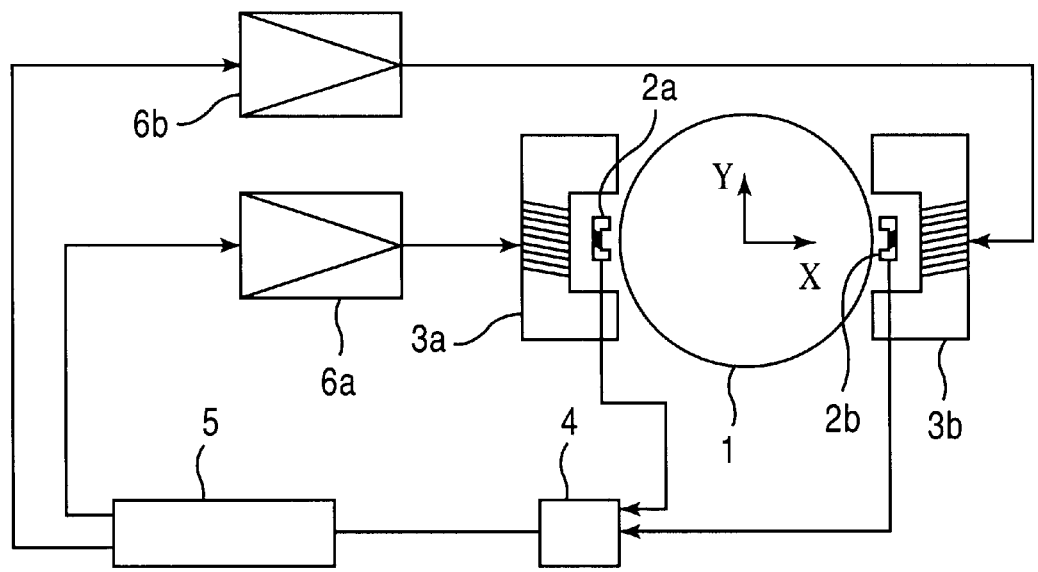
FIG. 1 is a schematic view showing a basic configuration of a conventional controlled magnetic bearing apparatus.

Embodiments of the present invention will be described below with reference to FIGS. 2 through 29C. In these drawings, the same reference numerals denote the same or corresponding portions.

Figure 2:
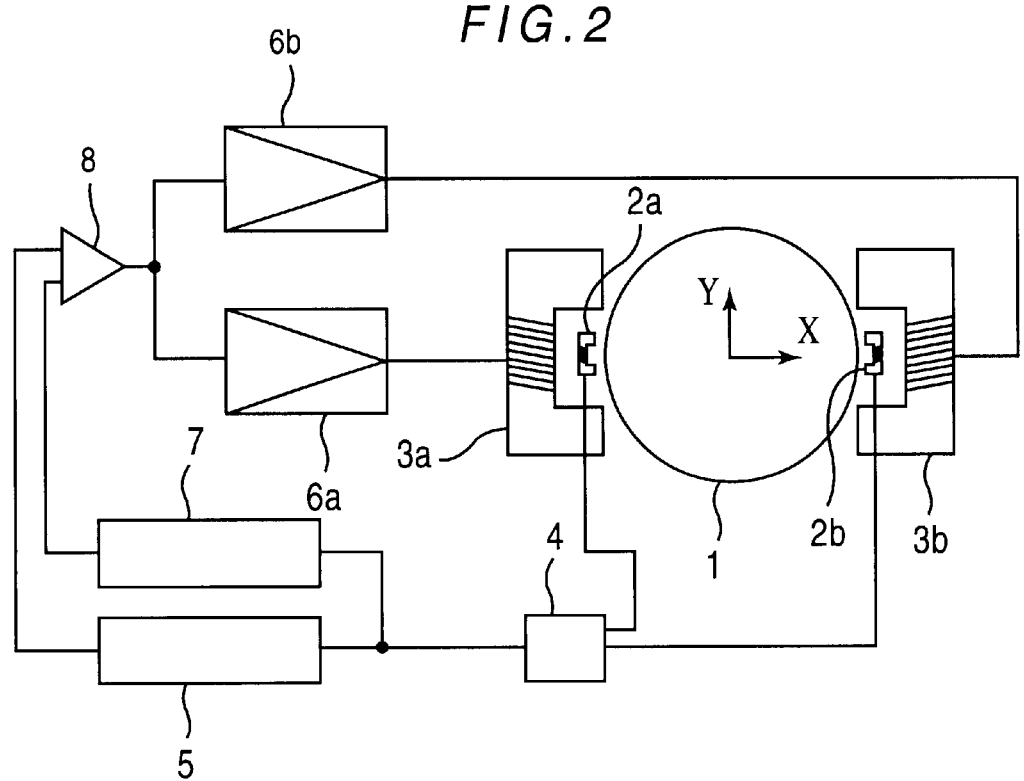
FIG. 2 is a schematic view showing a basic configuration of a controlled magnetic bearing apparatus according to an embodiment of the present invention.

FIG. 2 is a schematic view showing a basic configuration of a controlled magnetic bearing apparatus according to an embodiment of the present invention. As in the case of the conventional example shown in FIG. 1, for easy understanding, in an illustrated example, a part of a bearing apparatus for radially supporting a rotating shaft 1 has been extracted and is designed to control a vibration amplitude of the rotor 1 in an X-axis direction of an X-Y plane (transverse plane) perpendicular to the rotating shaft 1. Specifically, in FIG. 2, the horizontal axis is taken in an X-axis direction, and the vertical axis in a Y-axis direction, about a center of the rotor 1. Displacement sensors 2a, 2b, and electromagnets 3a, 3b are disposed on the X-axis with interposing the rotor 1 therebetween. Electric currents to be supplied to the electromagnets 3a, 3b are controlled based on sensor signals from the displacement sensors 2a, 2b. Electromagnets and displacement sensors are similarly disposed on the Y-axis with interposing the rotor 1 therebetween, and electric currents are controlled in the same manner.

As shown in FIG. 2, the displacement sensors 2a, 2b, which are disposed on the X-axis with interposing the rotor 1 therebetween and detect radial displacements of the rotating shaft 1, are connected to a sensor amplifier 4. The displacement sensors 2a, 2b and the sensor amplifier 4 constitute a displacement sensor unit. An output signal from the sensor amplifier 4 is an electric signal (sensor signal) corresponding to a displacement of the rotor 1 in the X-axis direction. The sensor signal is inputted into a first control unit 5 and a second control unit 7 disposed in parallel with the first control unit 5.

The first control unit 5 calculates a first control signal based on the sensor signal, and outputs the first control signal as a control current. The second control unit 7 generates a second control signal changed in phase from the sensor signal, and outputs the second control signal as a control current. The first and second control signals (control currents) are synthesized (added together) by a signal synthesizer 8. The synthesized control signal is amplified by power amplifiers 6a, 6b respectively connected to the electromagnets 3a, 3b, and then supplied to coils of the electromagnets 3a, 3b. In each of the electromagnets 3a, 3b, an electromagnetic force is generated by the electric current supplied to each of the coils of the electromagnets 3a, 3b. The rotor 1 is magnetically attracted to the electromagnets 3a, 3b by the electromagnetic forces. Thus, based on only sensor signal outputs from the displacement sensors 2a, 2b for detecting radial displacements of the rotor 1, the control currents are supplied to a pair of the electromagnets 3a, 3b disposed at an opposite position to each other on the X-axis, and hence the rotor 1 is servo controlled so as to be held in a levitated state at a center position by the attracting forces of the electromagnets 3a, 3b.

Figure 3:
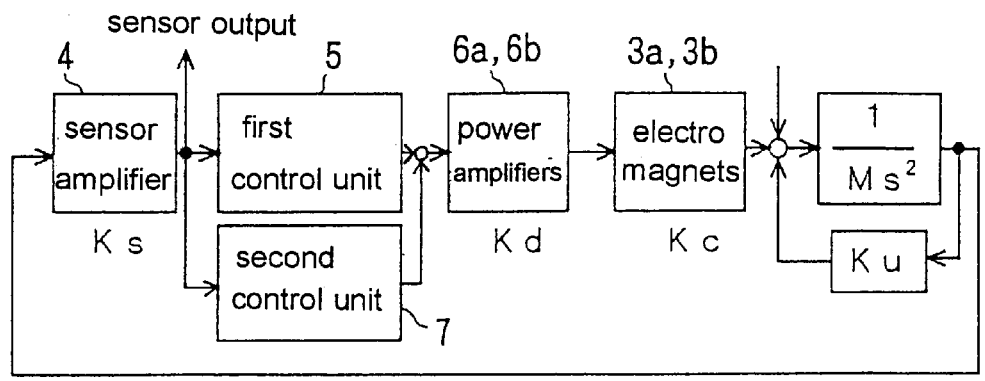
FIG. 3 is a block diagram showing a model of a control system in FIG. 2.

FIG. 3 is a block diagram showing a control system with modeling the sensor amplifier 4, the first control unit 5, the second control unit 7, the power amplifiers 6a, 6b, the electromagnets 3a, 3b, and a magnetic bearing in the control system shown in FIG. 2. The magnetic bearing is represented as the simplest system by the illustrated functions ($1/MS^2$, K) based on the mass M of the rotor and the stiffness Ku of the magnetic bearing. In these functions, S denotes Laplacian.

Figure 4:
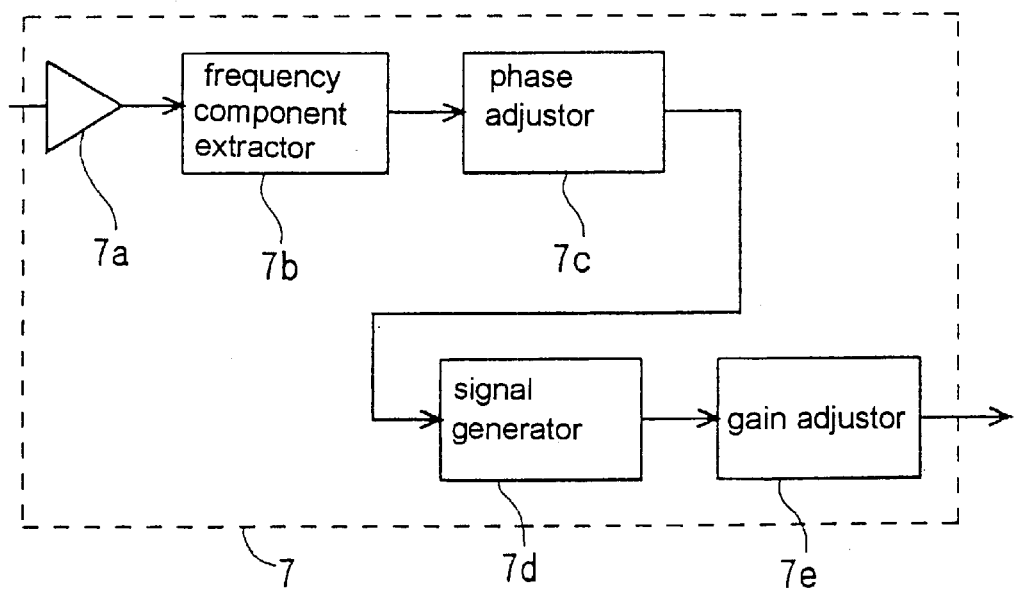
FIG. 4 is a schematic view showing a configuration of a second control unit in FIG. 2.

FIG. 4 shows an example of a configuration of the second control unit 7. The second control unit 7 comprises a buffer amplifier 7a, a rotational frequency component extractor 7b, a phase (phase shift) adjustor 7c, a signal generator 7d including a comparator, and a gain adjustor 7e. According to this arrangement, a rotational frequency component is extracted from the sensor signal amplified in the buffer amplifier 7a by the rotational frequency component extractor 7b, which is a filter. The phase of the extracted signal is adjusted by the phase adjustor 7c. Then, an output signal from the phase adjustor 7c is compared with a reference electric potential by the comparator to thus generate a signal oscillating in positive and negative directions with respect to 0 V. A signal adjusted in amplitude by the gain adjustor 7e is outputted into the signal synthesizer 8.

Specifically, the sensor signal is passed through the rotational frequency component extractor 7b to extract a signal component corresponding to a rotational speed of a motor. Further, an adjustment amount of an arbitrary phase (phase shift) is imparted to the signal component. The resulting signal is received by the signal generator 7d including the comparator. Thus, frequency and phase information of the signal corresponding to the rotational speed of the motor is transmitted downstream. However, amplitude information is blocked. Since such a signal processing is required, the signal generator 7d including the comparator is used.

Figure 5:
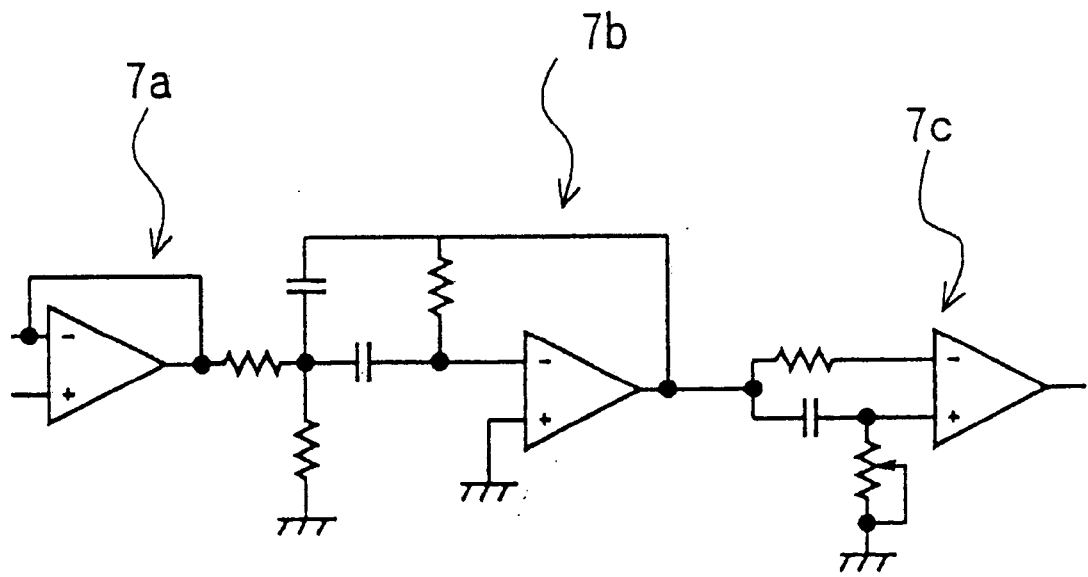
FIG. 5 is a schematic view showing an example of a circuit configuration of a buffer amplifier, a frequency component extractor, and a phase adjustor.

FIG. 5 shows an example of a concrete circuit configuration of the buffer amplifier 7a, the rotational frequency component extractor 7b, and the phase adjustor 7c in the second control unit 7. As shown in FIG. 5, these devices have a simple structure composed of general-purpose operational amplifiers and CR elements. Specifically, the buffer amplifier 7a comprises an amplifier using an operational amplifier. The rotational frequency component extractor 7b comprises a filter circuit having a combination of an operational amplifier and CR elements. The phase adjustor 7c similarly comprises a circuit having a combination of an operational amplifier and CR elements, and can adjust a phase amount by adjusting a volume connected to the ground.

In these circuits, a sine wave of the frequency component synchronized with the sensor signal from the displacement sensors 2a, 2b is extracted, and its phase is adjusted by adjusting the volume of the phase adjustor 7c. The phase adjustment within the range of 0 to 180 degrees can be achieved by adjusting the volume of the variable resistor.

Figure 6:
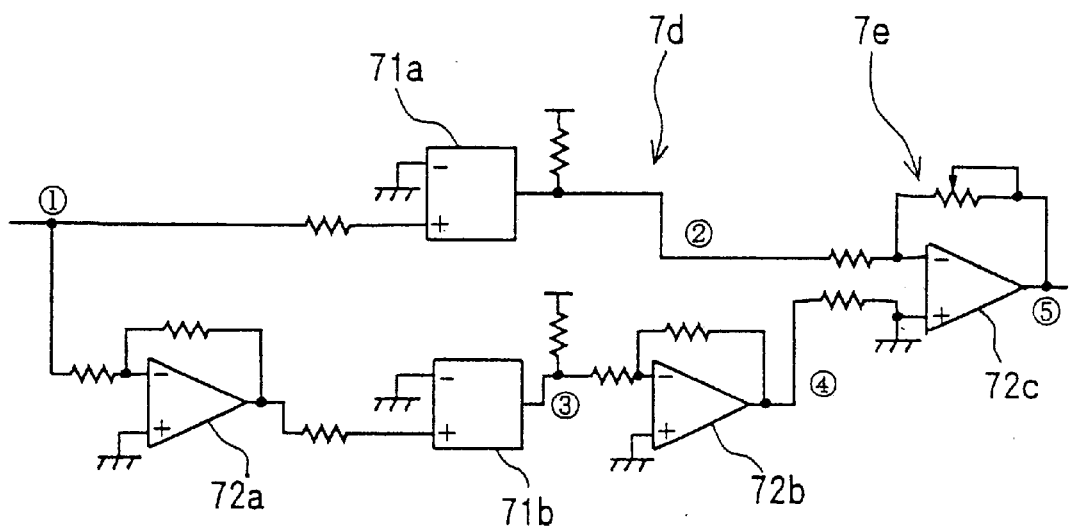
FIG. 6 is a schematic view showing an example of a circuit configuration of a signal generator and a gain adjustor, and signal waveforms in each of portions.
Figure 6:
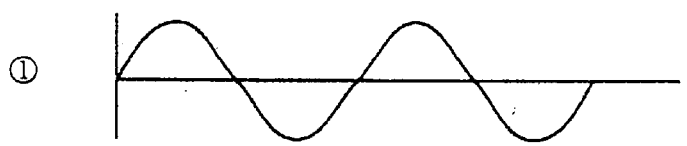
Figure 6:
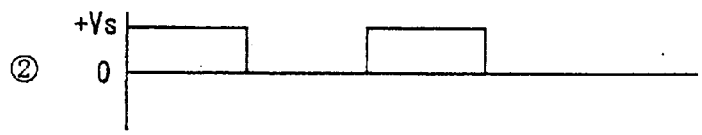
Figure 6:
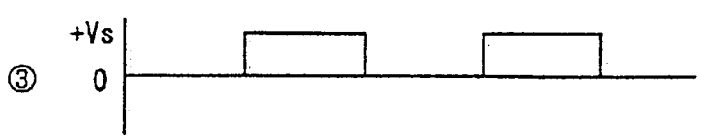
Figure 6:
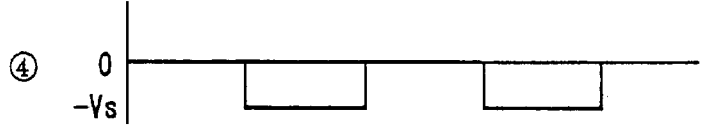

FIG. 6 shows an example of a circuit configuration of the signal generator 7d including the comparator, and the gain adjustor 7e. FIG. 6 further shows signal waveforms in each of portions. As shown in FIG. 6, the signal generator 7d comprises a circuit having a combination of comparators 71a, 71b and operational amplifiers 72a, 72b for inverting a sign. The signal generator 7d generates an output signal oscillating between the plus (+) side and minus (−) side with respect to 0 V (ground potential), as described later on. The gain adjustor 7e comprises an amplifier having an operational amplifier 72c.

The output signal from the phase adjustor 7c is a sine wave as shown in ①, and branched into two signals. One of the signals is compared with the reference electric potential by the comparator 71a, for thereby generating a rectangular wave as shown in ②. The other signal is inputted into the inverter 72a and comparator 71b to generate a rectangular wave as shown in ③, which is inversion of the waveform shown in ②. This waveform is further inverted by the inverter 72b to generate a waveform as shown in ④. An amplitude of the resulting waveform is adjusted and combined by the amplifier 72c of the gain adjustor 7e to generate a rectangular wave oscillating upwardly and downwardly with respect to the ground potential, as shown in ⑤. A gain adjustor disposed in a power amplification circuit for driving the electromagnets in the conventional controller shown in FIG. 1 is used as the gain adjustor 7e.

As is apparent from the aforementioned circuit configuration of the second control unit 7, only the frequency and phase information of the sensor signal is extracted and outputted from the second control unit 7 after its phase is adjusted. This output signal is added to the signal from the first control unit 5 by the signal synthesizer 8. Thus, no amplitude information of the sensor signal is transmitted downstream.

The rotational frequency signal extractor 7b in the second control unit 7 may, for example, comprise a band-pass filter having the analog circuit shown in FIG. 5, or may comprise a voltage tuning band-pass filter of a commercially available functional module. The voltage tuning band-pass filter can adjust a passing frequency by adjusting a center frequency to a frequency corresponding to an external voltage signal of 0 to 10 V. For example, the model VT-2BPA shown in the catalog No. D98X-D16-23A2 of NF Corp., and the model FLJ-VB shown in data sheet No. 85/9/5K/13.2 of Datel Inc., and the like, are used as this band-pass filter.

FIGS. 7A through 7D are schematic views showing a modified example of the signal generator 7d. The signal generator 7d shown in FIG. 6 comprises several comparators and operational amplifiers. On the other hand, in this modified example, two operational amplifiers, i.e., a comparator 77 including an operational amplifier and an inverting amplifier (inverter) 78 including an operational amplifier, can constitute a circuit for the equivalent function.

Figure 7A:
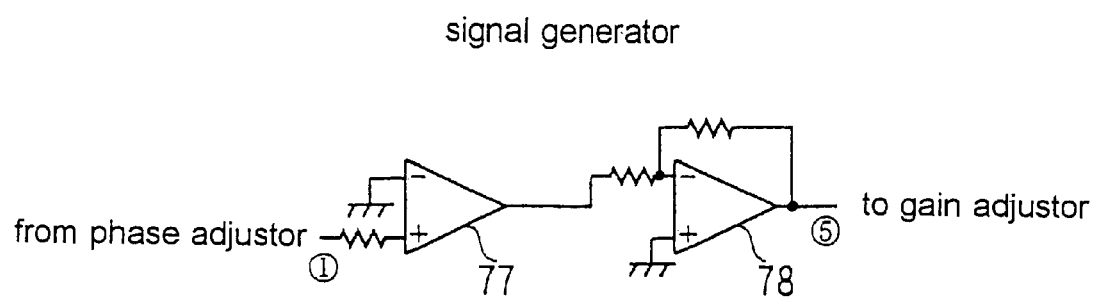
FIGS. 7A through 7D are schematic views showing a modified example of the signal generator.
Figure 7B:
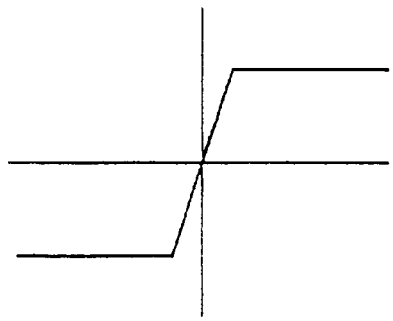
Figure 7C:
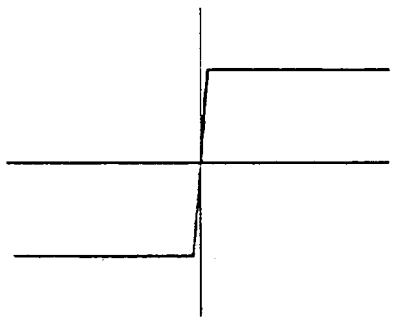
Figure 7D:
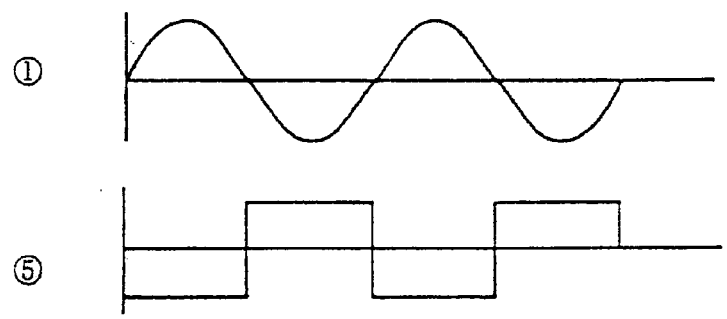

The comparator 77 comprises nonlinear circuit components having input/output characteristics as shown in FIG. 7B or 7C. As shown in FIG. 7D, a rectangular wave signal ⑤ oscillating between the positive and negative sides with respect to zero volt can be generated, with an extremely simple circuit, from an input signal of a sine wave ① by the comparator 77 having such input/output characteristics. As in the case of the circuit shown in FIG. 6, only a frequency component and a phase component of the sensor signal can be transmitted downstream without its amplitude component being transmitted downstream.

Figure 8:
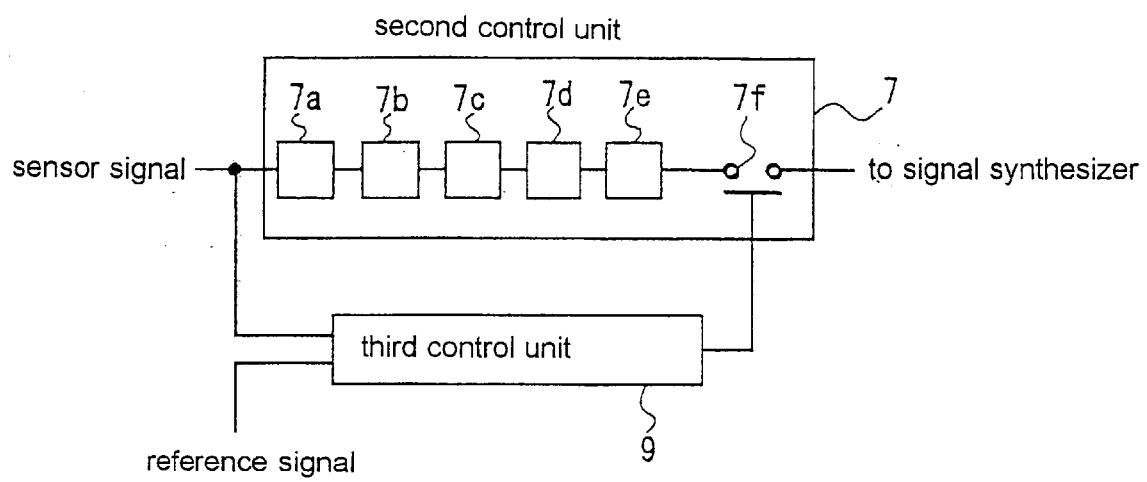
FIG. 8 is a schematic view showing an example of a configuration of the second control unit having a signal switch for switching on and off a signal.

FIG. 8 shows an example in which a signal switch 7f is provided at the downstream side of the gain adjustor 7e in the second control unit 7, and a third control unit 9 is further provided. In this example, a sensor signal is compared with a reference signal, and when the sensor signal is more than a reference value, i.e., when whirling is greater than a predetermined value (reference value), the signal switch 7f is turned on.

Specifically, there are provided the signal switch 7f for switching on and off a flow of a signal in the second control unit 7, and the third control unit 9 for comparing the sensor signal of the displacement sensors 2a, 2b with the reference signal in order to turn the signal switch 7f on or off. Only when the sensor signal is more than a predetermined reference value, the signal switch 7f is turned on in order to add the output signal of the second control unit 7 to the output signal of the first control unit 5.

Figure 9:
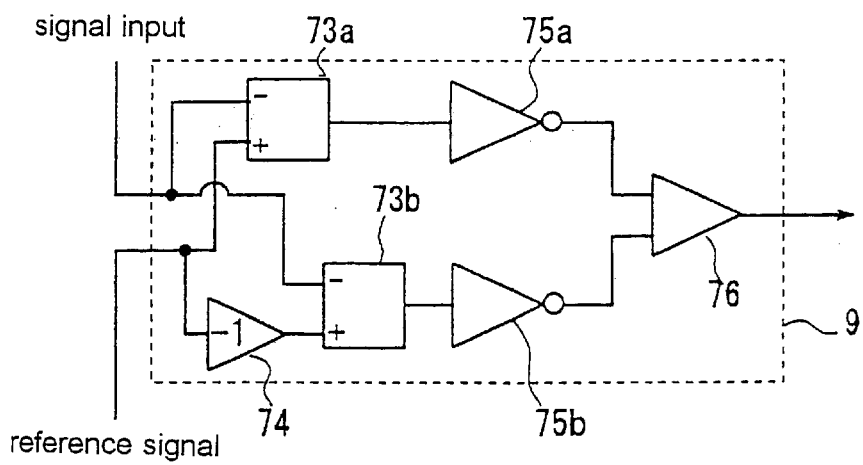
FIG. 9 is a schematic view showing an example of a circuit configuration of a third control unit.

FIG. 9 shows an example of a configuration of the third control unit 9. The third control unit 9 comprises comparators 73a, 73b, an inverting amplifier 74, inverters 75a, 75b, and an adder 76.

Figure 10:
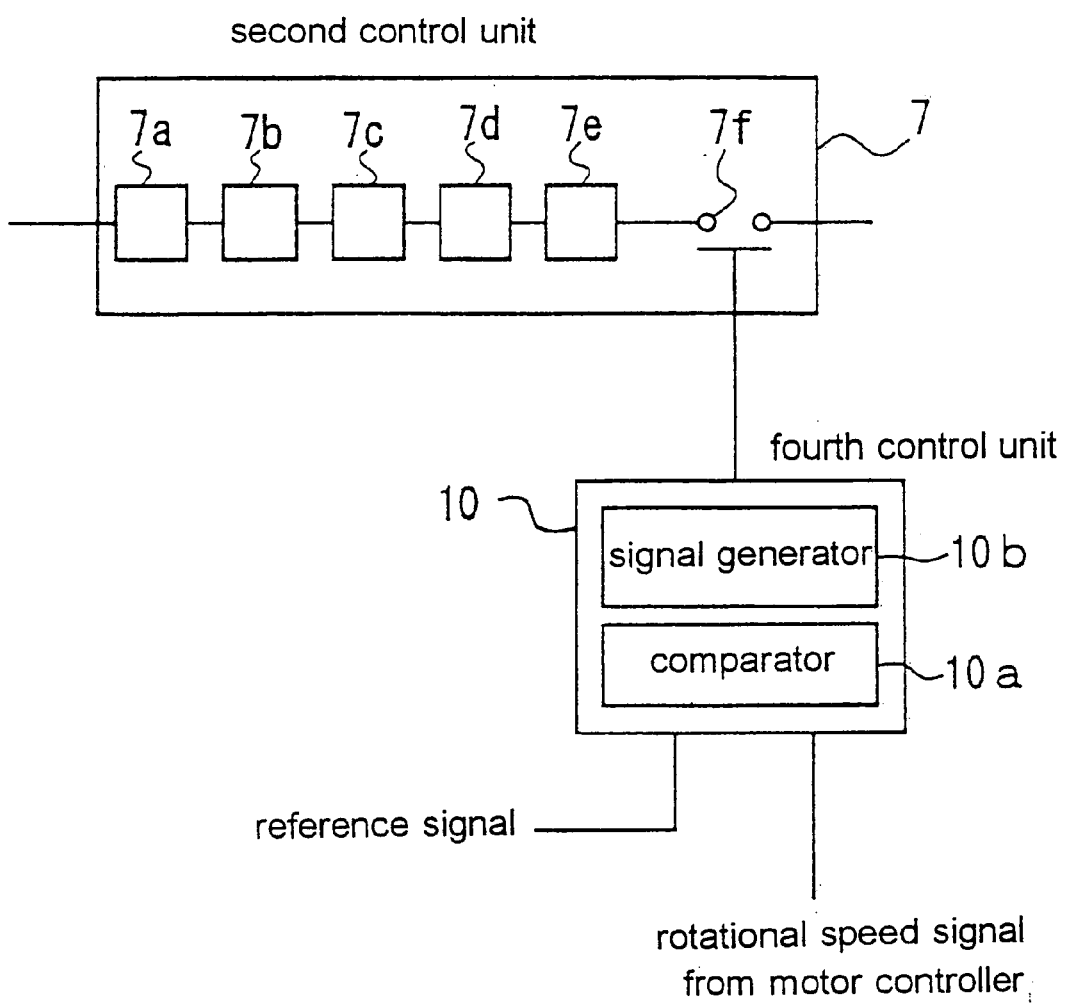
FIG. 10 is a schematic view showing an example of a configuration of a control unit for switching on and off a signal by a fourth control unit.

FIG. 10 shows an example having a fourth control unit 10 which compares a voltage signal proportional to a rotational speed from a motor controller with a reference signal to thus turn on a signal switch 7f when the voltage signal is more than the reference signal. The fourth control unit 10 comprises a comparator 10a for comparing an actual rotational speed signal with the reference signal, and a signal generator 10b for generating an ON-OFF command signal to be inputted into the signal switch 7f provided in the second control unit 7 for switching on and off a flow of the signal.

According to the embodiment shown. in FIG. 8, the signal switch 7f in the second control unit 7 is turned on and off based on the sensor signal. On the other hand, according to the embodiment of FIG. 10, the signal switch 7f in the second control unit 7 can be turned on and off based on the rotational speed signal from the motor controller. Specifically, when the rotational speed of the motor is greater than a predetermined value, the signal switch 7f is turned on and off.

Figure 11A:
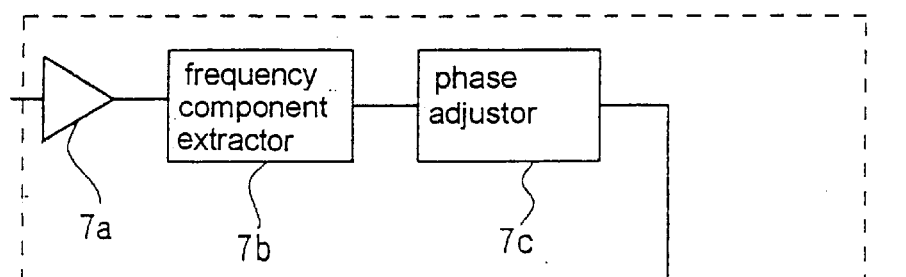
FIGS. 11A through 11C are schematic views showing examples of a configuration of the second control unit having a second frequency component extractor provided therein.
Figure 11B:
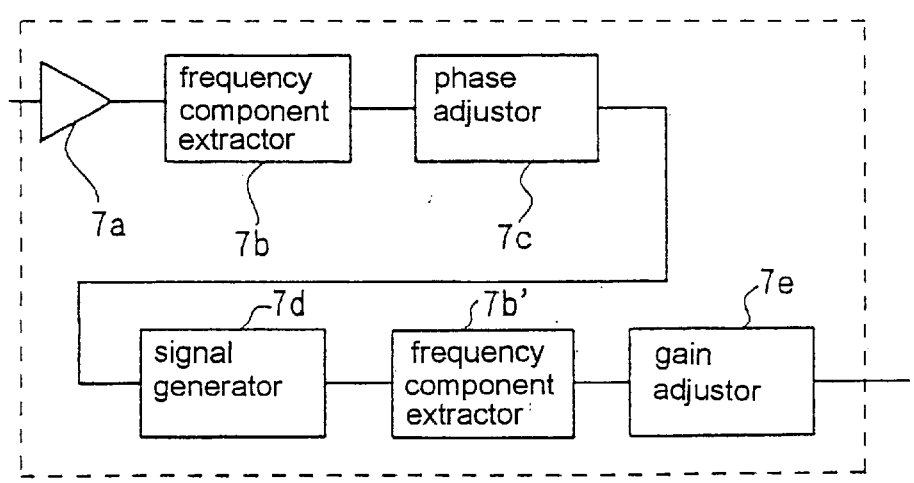
Figure 11C:
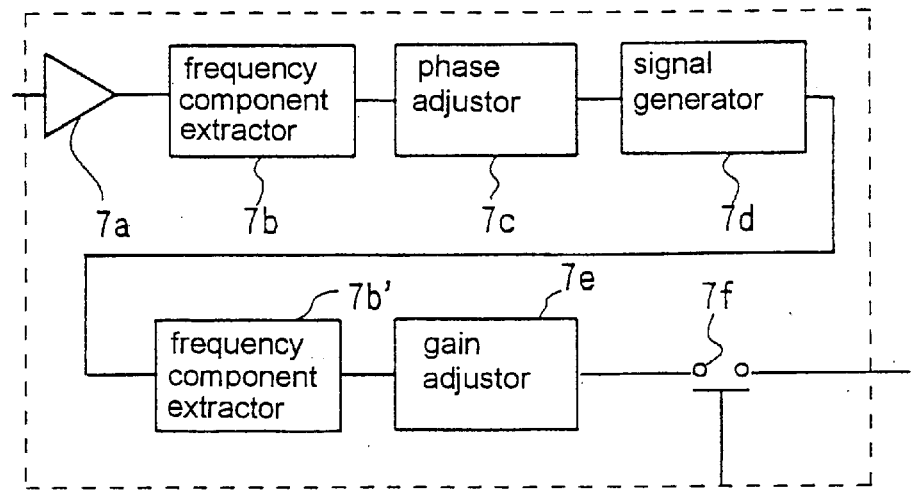

FIGS. 11A through 11C show modified examples of configurations of the second control unit. In FIG. 11A, a rotational frequency component extractor 7b', which is a filter having the same function as the rotational frequency signal extractor 7b, is provided at the downstream side of the gain adjustor 7e in the second control unit 7. With this configuration, a rectangular wave signal can be converted into a low-order sine wave signal synchronized with a rotational frequency. Thus, the effect of suppressing whirling of the rotor is somewhat lower than that in a case where a rectangular wave signal is inputted as a control output into the power amplifier. However, since an electric current of a harmonic component can be prevented from flowing, it is not necessary to excite higher modes of the rotor.

FIG. 11B shows an embodiment in which the rotational frequency component extractor 7b' and the gain adjustor 7e in FIG. 11A are interchanged with each other. Similarly, FIG. 11C shows an embodiment in which the signal switch 7f for switching on and off a flow of a signal shown in FIG. 8 is provided in the second control unit 7. Further, if an external force having a natural frequency not synchronized with the rotational speed acts on the rotor, the rotational frequency signal extractors 7b, 7b' in the second control unit 7 may be used as extractors of the natural frequency signal.

Figure 12:
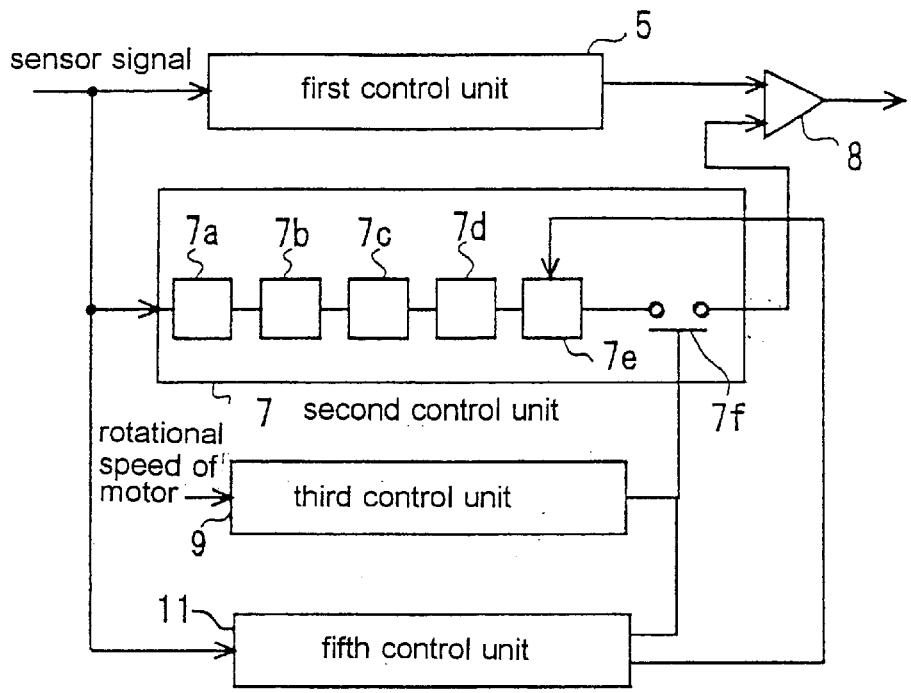
FIG. 12 is a schematic view showing an example of a configuration of a controlled magnetic bearing apparatus having a fifth control unit for adjusting a gain.

FIG. 12 shows an embodiment having a fifth control unit 11 which monitors a sensor signal, and compares the amplitude of the sensor signal at the time when the signal switch 7f in the second control unit 7 is turned on and the amplitude of the sensor signal at the time when the signal switch 7f is turned off, and hence sets the volume of the gain adjustor 7e. Specifically, the fifth control unit 11 is adapted to compare the amplitude of the sensor output at the time when the signal switch 7f in the second control unit 7 is turned off, with the amplitude of the sensor output at the time when the signal switch 7f is turned on, for thereby changing a set value of a gain in the gain adjustor 7e. With this configuration, when the rotational speed of the motor becomes more than a predetermined value, the switch 7f is turned on by the third control unit 9 for suppressing the whirling in such a state that an appropriate gain is set for the gain adjustor 7e. Thus, whirling can be suppressed more effectively.

Figure 13:
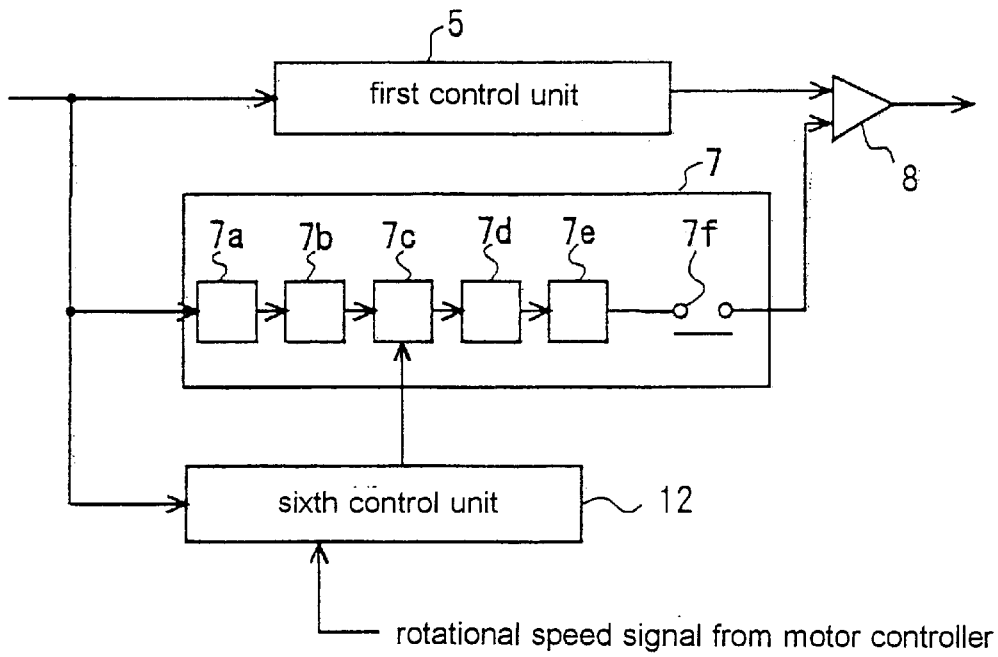
FIG. 13 is a schematic view showing an example of a configuration of a controlled magnetic bearing apparatus having a sixth control unit which can be adapted to speeds over a wide range.

FIG. 13 shows an embodiment having a sixth control unit 12. In this embodiment, a voltage signal proportional to the rotational speed from the motor controller and the sensor signal are inputted into the sixth control unit 12, and phase adjustment values have been set beforehand for each of rotational speeds. A phase adjustment value corresponding to the rotational speed of the motor is set for the phase adjustor 7c. A filter circuit for changing the frequency by varying the voltage is used as the rotational frequency component extractor 7b. This configuration permits the frequency component corresponding to the rotational speed of the motor to be extracted.

Figure 14:
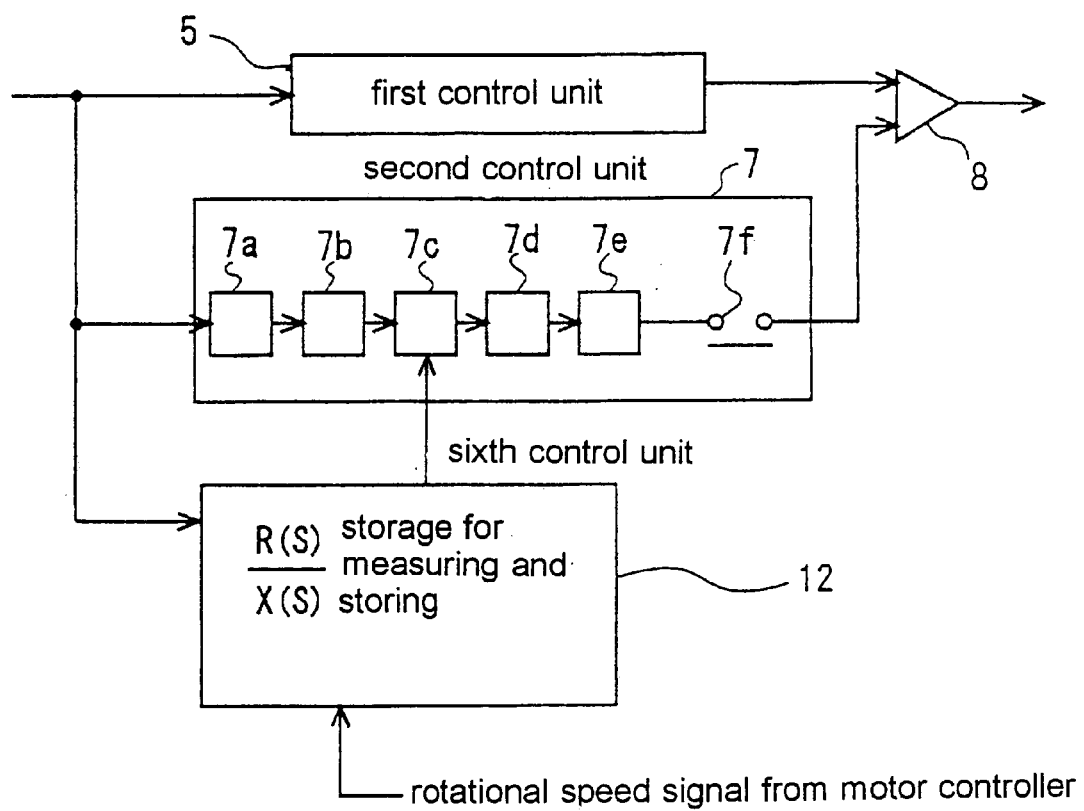
FIG. 14 is a schematic view showing an example of a configuration of an interior of the sixth control unit.

FIG. 14 shows an embodiment in which the sixth control unit 12 has a built-in storage for measuring and storing the transfer characteristics (gain, phase) of an output signal from the displacement sensor relative to an input signal for a power amplifier in a conventional servo control configuration, and reads a phase adjustment amount corresponding to the rotational speed of the motor from the stored data, and sets a phase adjustment amount for the phase adjustor 7c. With this configuration, since phase change amounts corresponding to arbitrary rotational speeds of the motor can be imparted, whirling can be suppressed at all rotational speeds ranging from a low speed to a high speed.

Figure 15A:
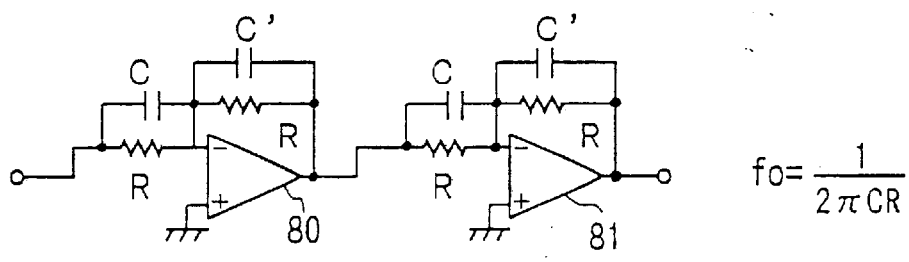
FIGS. 15A through 15C are schematic views showing an example of a configuration of a phase adjustor which can be adapted to speeds over a wide range.
Figure 15B:
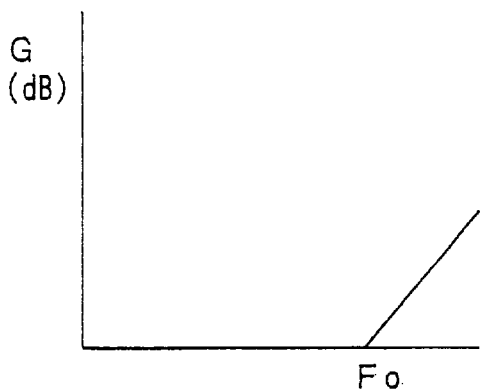
Figure 15C:
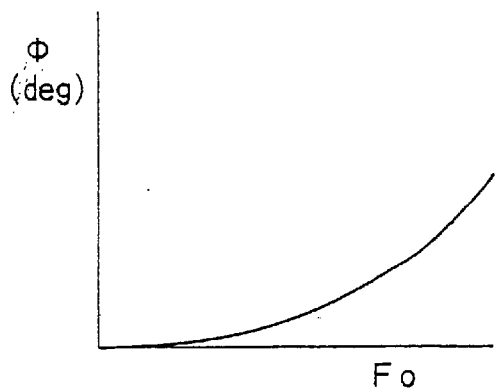

FIGS. 15A through 15C show a modified example of the sixth control unit 12. In the sixth control unit shown in FIG. 14, data on the transfer characteristics of the magnetic bearing are stored with the storage. On the other hand, the sixth control unit shown in FIGS. 15A through 18C is simulation result of the transfer characteristics of a magnetic bearing by use of an analog circuit. Specifically, as shown in FIG. 15A, two primary filter circuits, each comprising an operational amplifier and CR elements, are used in order to obtain gain characteristics as shown in FIG. 15B and phase characteristics as shown in FIG. 15C.

The capacitor elements C' cut off a wide-range gain and stabilize the action of operational amplifiers. This circuit configuration is generally used as a derivative element for an ordinary PID control (phase lead circuit). The characteristics shown in FIGS. 15B and 15C are simulation results of the transfer characteristics of the magnetic bearing shown in FIG. 17 to be described later on. For example, a phase change of about 90 to about 100 degrees can be imparted for 50 Hz, and a phase change of about 65 degrees can be imparted for 25 Hz. In this range, a gain is almost flat as shown in FIG. 15B.

Each of the controllers described above was operated in an actual machine. The results will be described below.

Figure 16:
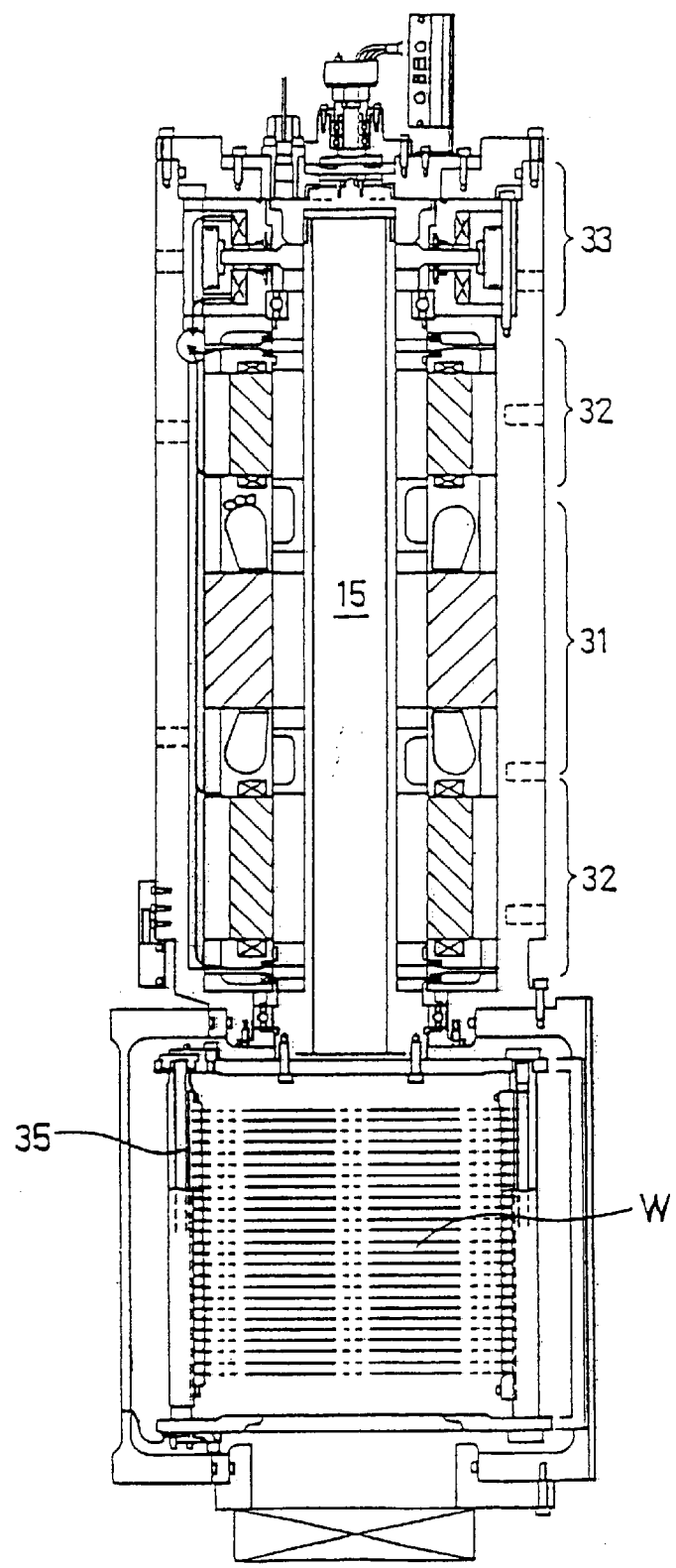
FIG. 16 is a schematic view showing a structure of a wafer spin dryer supported by a magnetic bearing.

FIG. 16 shows a prototype of a magnetically levitated spin dryer as a structural example of a motor body supported by a magnetic bearing. In the experiments for verification to be described below, a radial magnetic bearing 32 in FIG. 16 was used. In this machine, a rotating shaft 15 is axially supported by an axial magnetic bearing 33 and radially supported by the radial magnetic bearings 32, and rotationally driven by a motor 31. A wafer holder 35 located underneath accommodates twenty-five 8-inch wafers. A wafer W is supported at its outer periphery by three beams in total, i.e., two fixed bars and a detachable moving bar. Thus, an unbalance amount due to positional deviation of the wafer, and an unbalance amount due to deformation of the beam act on the rotating shaft 15.

Figure 17:
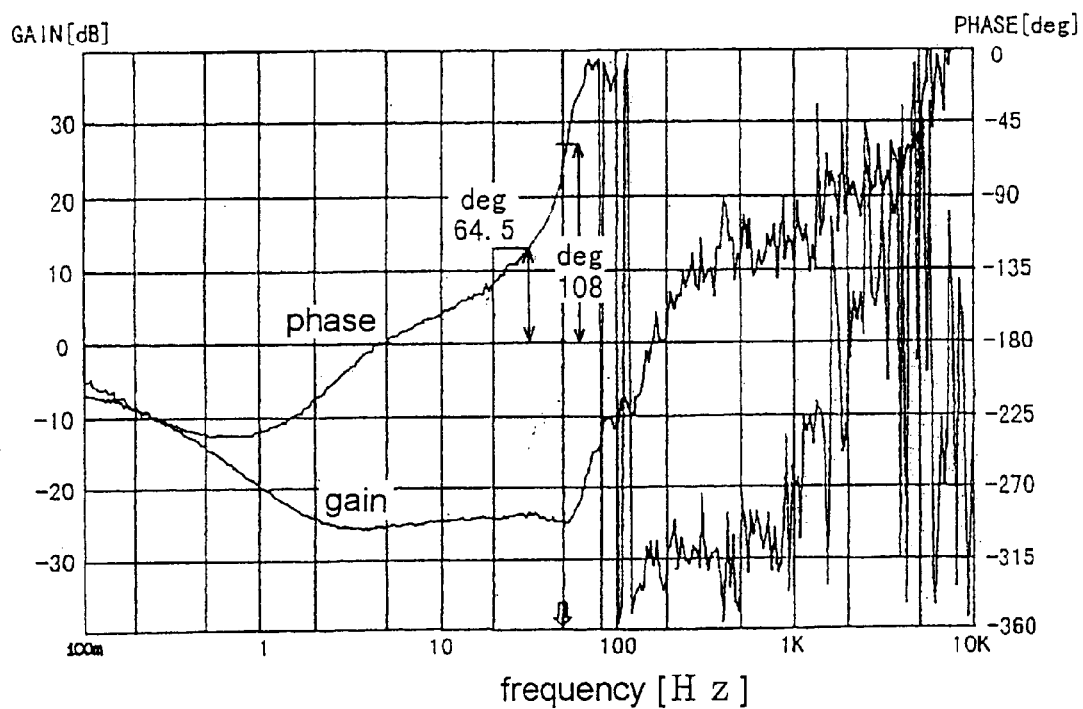
FIG. 17 is a schematic view showing an example of force/displacement transfer characteristics in a servo control system of a radial magnetic bearing.

FIG. 17 shows a measurement result of the characteristics (responses of displacement sensor outputs to power amplifier inputs) in a servo control system of one of the radial magnetic bearings. This result corresponds to R/S, the ratio of an external force (R) acting on the rotor as a disturbance to the corresponding displacement (S) of the rotor. Specifically, the denominator is the sensor signal (S) from the displacement sensor, while the numerator is the signal (R) added to the power amplifier input signal for measurement. The horizontal axis represents frequencies, and the vertical axis represents gains and phases.

When the gain characteristics are multiplied by the a known sensitivity constant Ks (V/m) of the displacement sensor, a gain of the power amplifier Kd (A/V), and a gain of the electromagnet Kc (N/A) (see FIG. 3), the products are equivalent to the frequency characteristics of the magnetic bearing stiffness (actually, however, this is not accurate because of their respective frequency responses).

The frequency range in which the spin dryer is actually operated is found to be 0 to 50 Hz (0 to 3,000 $min^{-1}$), and the phase characteristics are found to be about 108 degrees at 50 Hz and about 65 degrees at 25 Hz.

Attention should be paid to the phase characteristics, i.e., phase information at rotational operation frequencies. This phase information is a basis of an adjustment amount set for the phase adjustor in the second control unit.

The output current (A) from the power amplifier in response to its input voltage (V) has nonlinearity, and if the input voltage increases, frequency responses expressed by gain and phase may deteriorate remarkably. Specifically, when a whirling amplitude of the rotor becomes large, it is necessary to compensate the phase characteristics shown in FIG. 17 for the amount of deterioration in the frequency response of the power amplifier. It is also necessary to consider the frequency characteristics from the time when the output signal from the second control unit is inputted into the power amplifier, to the time when this signal finally acts on the rotor as a force. However, there is minimal influence at a relatively low frequency, and the values equivalent to the phase characteristics can be used. According to the results of the experiments, even if the compensation amount is an approximate value, an equivalent effect can be obtained.

FIGS. 18A through 21B show the results of tests corresponding to a conventional open balance control. The purpose of these tests was to verify that an effect could be obtained when the phase difference between the control signal and the sensor signal to be added together corresponded to the value estimated based on the phase data of the frequency characteristics of the magnetic bearing stiffness shown in FIG. 17. The control signal was generated by a commercially available signal generator.

Figure 18A:
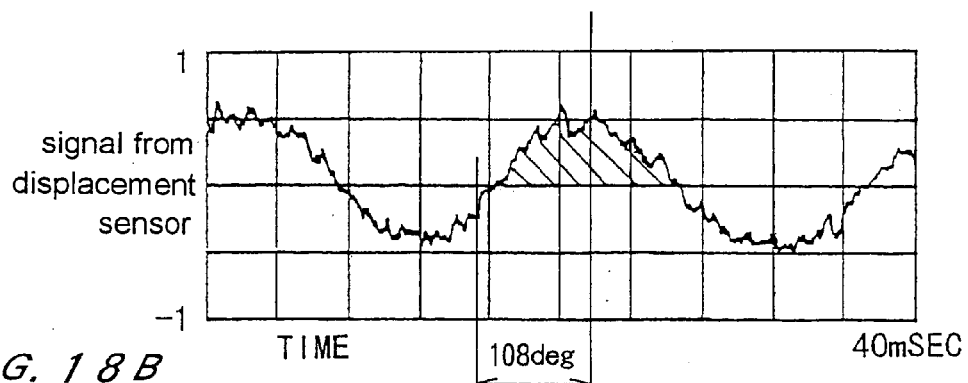
FIGS. 18A and 18B are schematic views showing results of tests corresponding to an open balance control when a control is turned off.
Figure 18B:
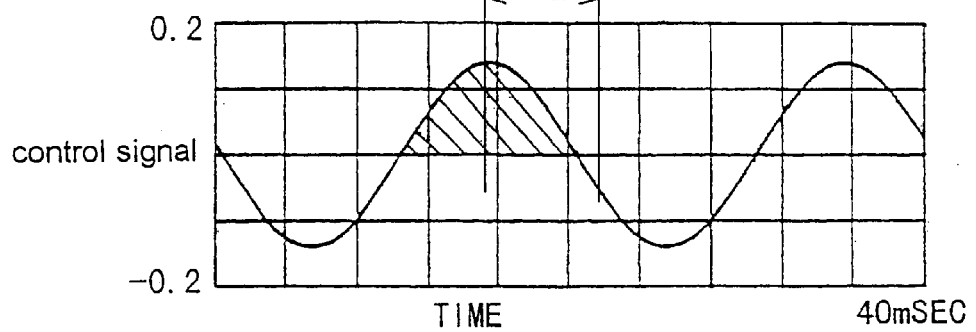
Figure 19A:
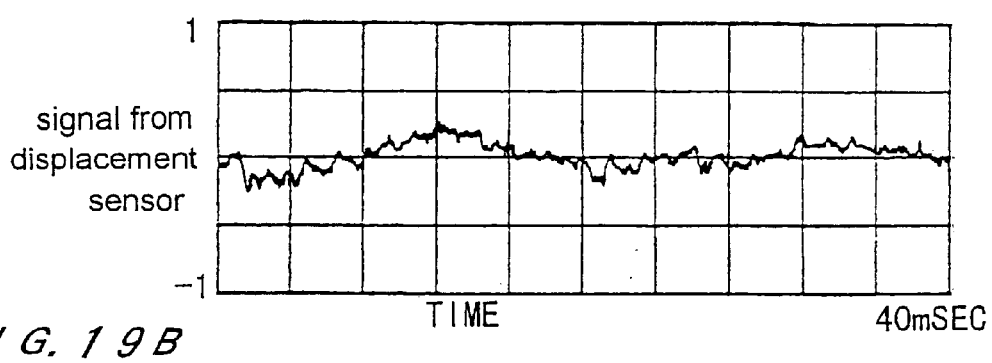
FIGS. 19A and 19B are schematic views showing results of tests corresponding to an open balance control when the control is turned on, and FIG. 19A shows outputs from the displacement sensor
Figure 19B:
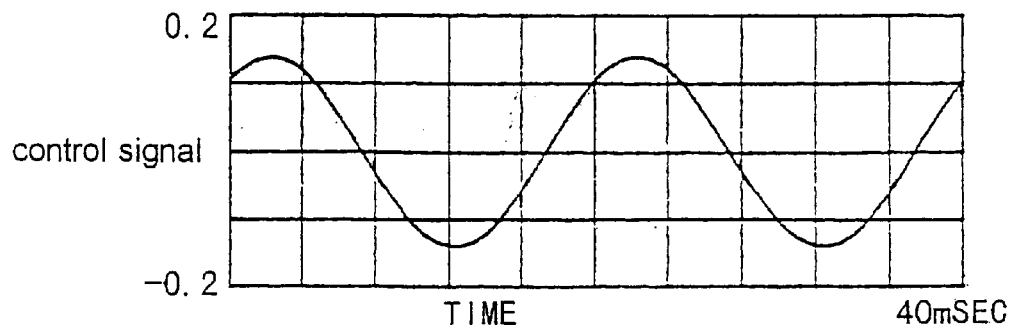

FIGS. 18A through 19B show states when the value estimated based on the phase data shown in FIG. 17, i.e., a phase difference of about 108 (deg), was imparted between the control signal and the sensor signal at a rotational speed of 3,000 $min^{-1}$ (50 Hz). FIG. 18A show waveforms over time when the control was turned off, while FIGS. 19A and 19B show waveforms over time when the control was turned on. FIGS. 18A and 19A show output signals from the displacement sensor, and FIGS. 18B and 19B show control signals. It is apparent from these drawings that when a phase difference of about 108 (deg) was imparted between the control signal and the sensor signal at a rotational speed of 3,000 $min^{-1}$ (50 Hz), whirling of the rotor was suppressed.

When the phase amount was slightly changed upward or downward, the effect was barely changed, although this is not shown.

Figure 20A:
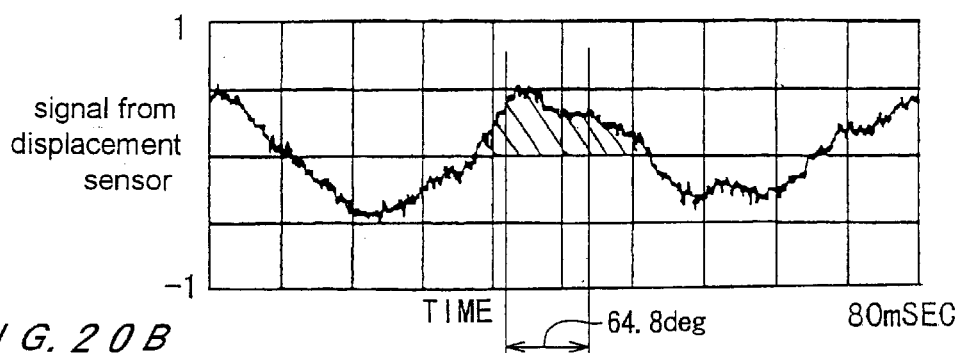
FIGS. 20A and 20B are schematic views showing results of tests corresponding to an open balance control when a control is turned off.
Figure 20B:
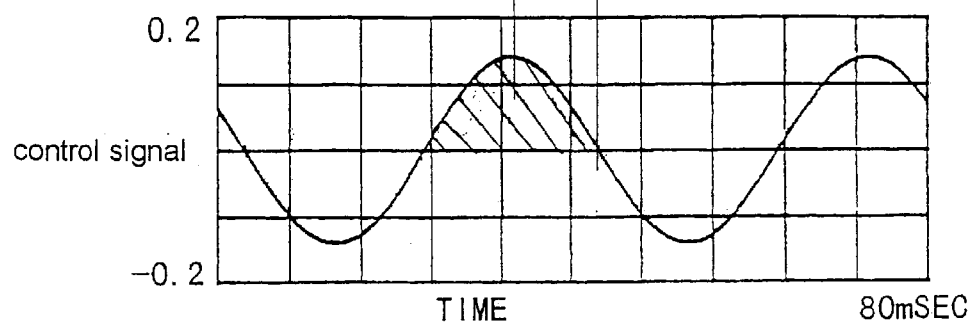
Figure 21A:
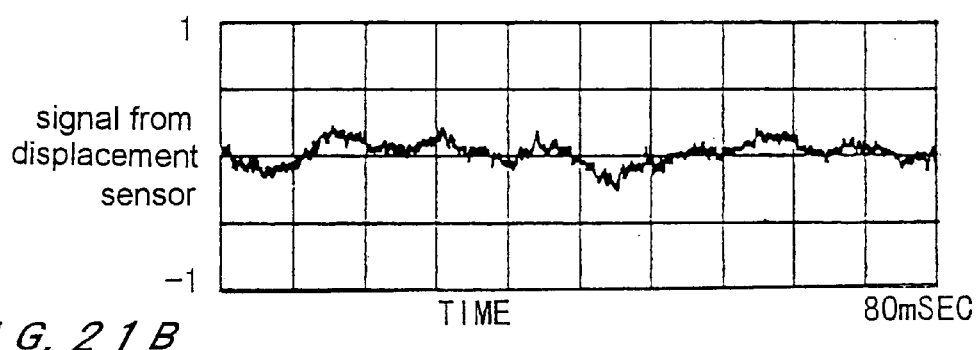
FIGS. 21A and 21B are schematic views showing results of tests corresponding to an open balance control when the control is turned on, and FIG. 21A shows outputs from the displacement sensor
Figure 21B:
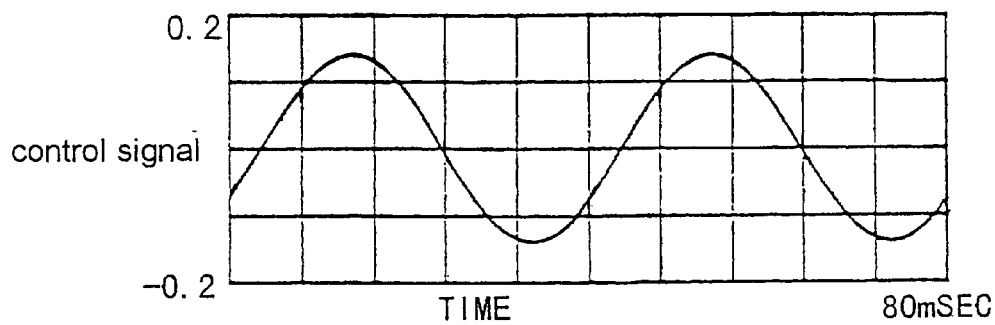

FIGS. 20A through 21B show states when the value estimated based on the phase data shown in FIG. 17, i.e., a phase difference of about 64.8 (deg), was imparted between the control signal and the sensor signal at a rotational speed of 1,500 $min^{-1}$ (25 Hz). FIGS. 20A through 21B show waveforms over time when the control was turned off, while FIGS. 21A and 21B show waveforms over time when the control was turned on. FIGS. 20A and 21A show output signals of the displacement sensor, and FIGS. 20B and 21B control signals. It is apparent from these drawings that when a phase difference of about 64.8 (deg) was imparted between the control signal and the sensor signal at a rotational speed of 1,500 $min^{-1}$ (25 Hz), whirling of the rotor was suppressed.

When this phase amount was slightly changed upward or downward, the effect was barely changed, although this is not shown.

Figure 23A:
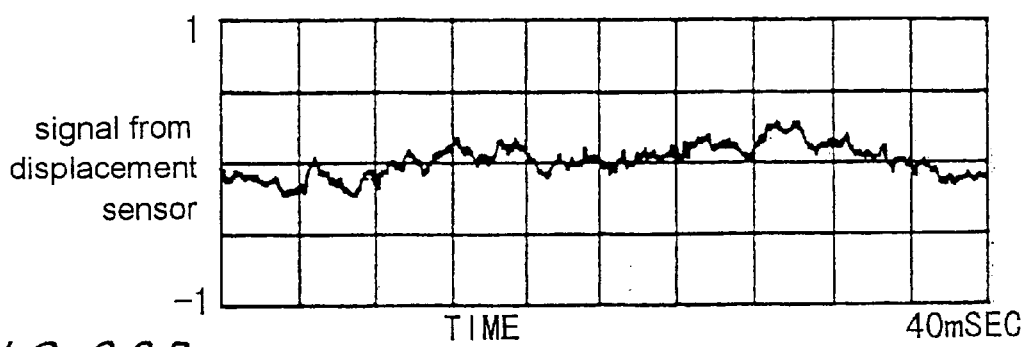
FIGS. 23A and 23B are schematic views showing results of tests according to the present invention when the control is turned on, FIG. 23A shows outputs from the displacement sensor
Figure 23B:
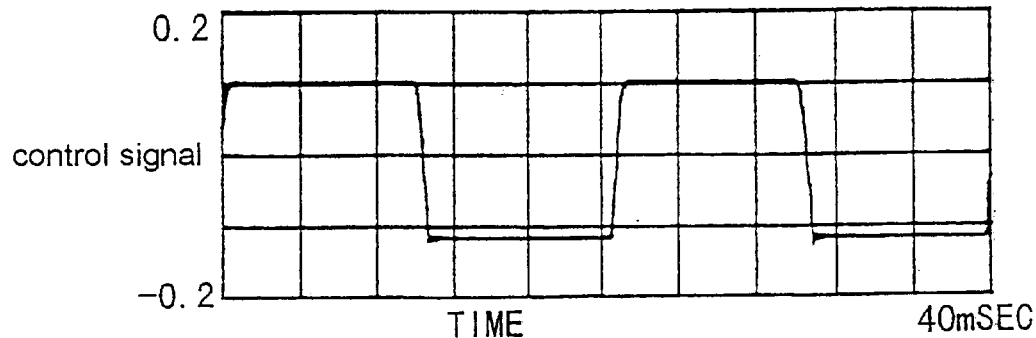
Figure 26:
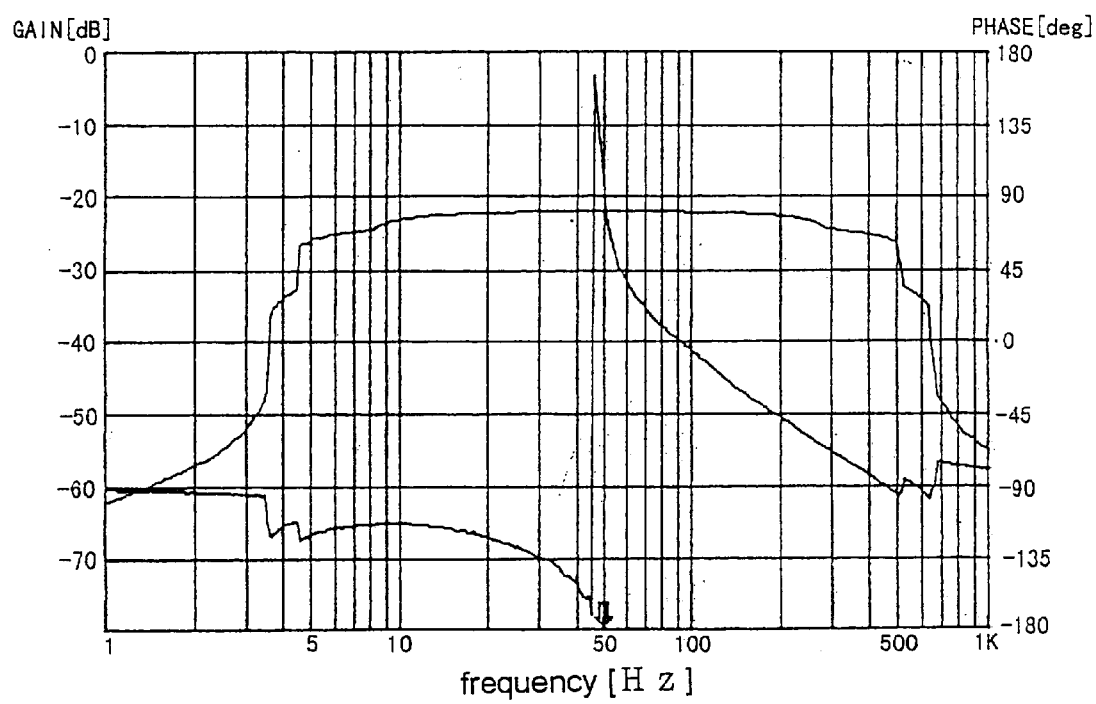
FIG. 26 is a schematic view showing an example of frequency characteristics of a gain and a phase of the control circuit shown in FIGS. 2 through 6.

The controlled magnetic bearing apparatus shown in FIGS. 2 through 6 was used to verify its effect of suppressing whirling of the rotor 1. The results are shown in FIGS. 22A through 23B. The rotational speed was 3,000 $min^{-1}$, and FIGS. 22A through 22B show waveforms over time when the control was turned off, while FIGS. 23A and 23B show waveforms over time when the control was turned on. FIGS. 22A and 23A show output signals from the displacement sensor, and FIGS. 22B and 23B control signals. It is apparent from these drawings that the results equivalent to the results shown in FIGS. 18A through 19B through 19 were obtained. The transfer characteristics for the input signal and the output signal of the circuit used in these experiments are shown in FIG. 26. FIG. 26 shows that the phase adjustment was a lead angle of about 90 degrees to about 100 degrees at 3,000 $min^{-1}$ (50 Hz).

Figure 24A:
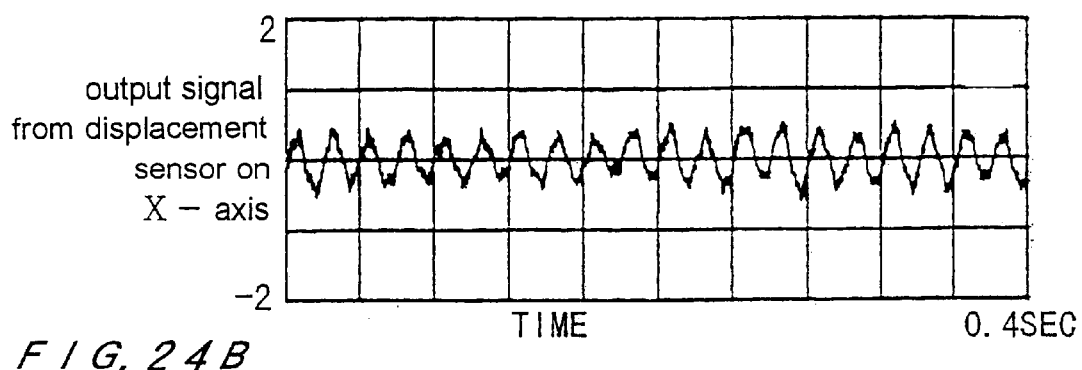
FIGS. 24A and 24B are schematic views showing results of tests according to the present invention when a control on an X-axis and a Y-axis is turned on, illustrating outputs from a displacement sensor.
Figure 24B:
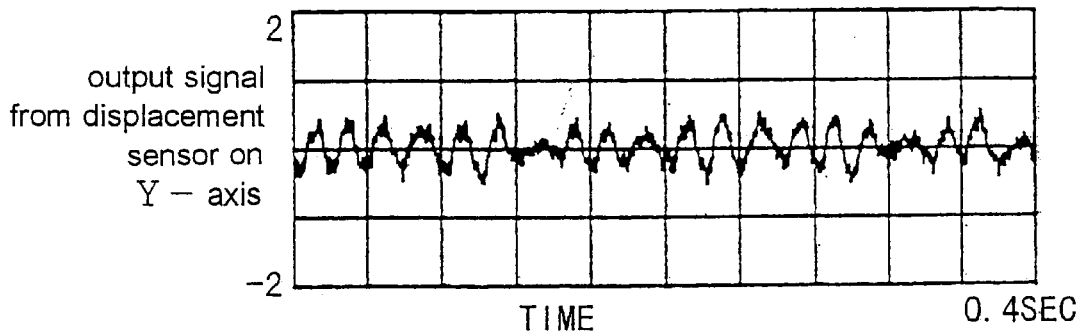
Figure 25A:
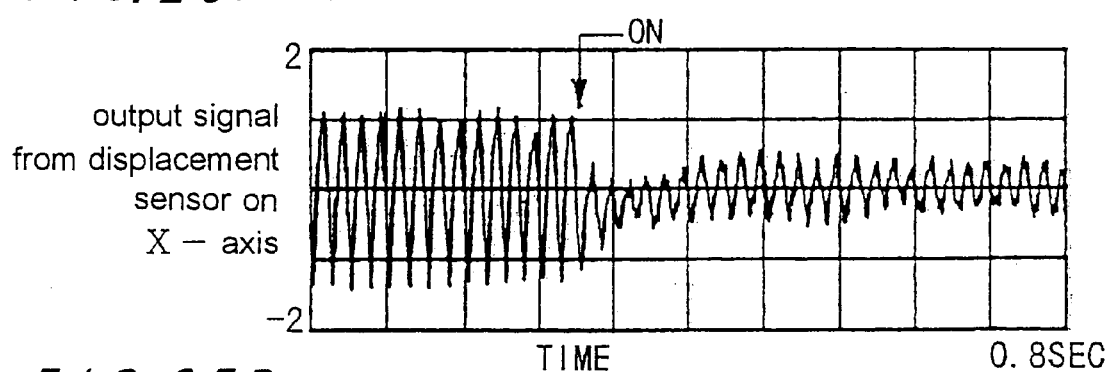
FIGS. 25A and 25B are schematic views showing results of tests according to the present invention when the control on the X-axis and the Y-axis is switched on, illustrating outputs from the displacement sensor.
Figure 25B:
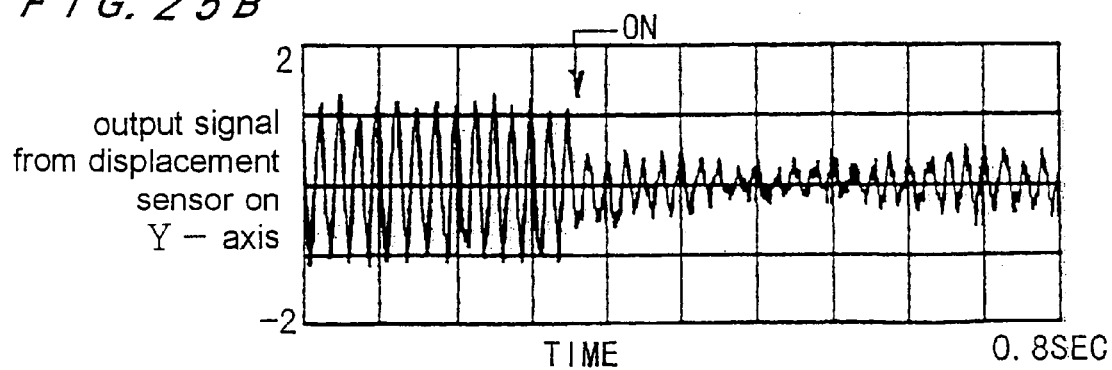

Further, FIGS. 24A through 25B show results of verification in a case where unbalance weights were increased, and where a conventional servo control led to a touchdown. In this case, the second control units were provided in each of two servo control systems on the X-axis and the Y-axis of the X-Y plane perpendicular to the rotating shaft. The rotational speed was 3,000 $min^{-1}$. FIGS. 24A and 24B show waveforms over time when the control was turned on. FIGS. 25A and 25B show waveforms over time when the control was turned on while the rotating shaft was being rotated with a touchdown. FIGS. 24A and 25A show waveforms of output signals from the displacement sensor on the X-axis over time. FIGS. 24B and 25B show the waveforms of output signals from the displacement sensor on the Y-axis over time. The effect of suppressing whirling can be confirmed from these drawings. The phase amounts used in these experiments, in comparison with the phase data of FIG. 17, were found to be about 20% more. In addition, as shown in FIG. 12, whirling amplitude can be suppressed by adjusting the setting of the gain adjustor in the second control unit. The upper limit of this effect can be determined by the basic performance of the power amplifier and the degree of magnetic saturation of the magnetic path of the electromagnet.

FIGS. 27 through 29C represent experimental data showing that even if the rotational speed changes sharply, the circuit configuration according to the present invention can fully suppress whirling of the rotor in the wafer spin dryer shown in FIG. 16.

Figure 27:
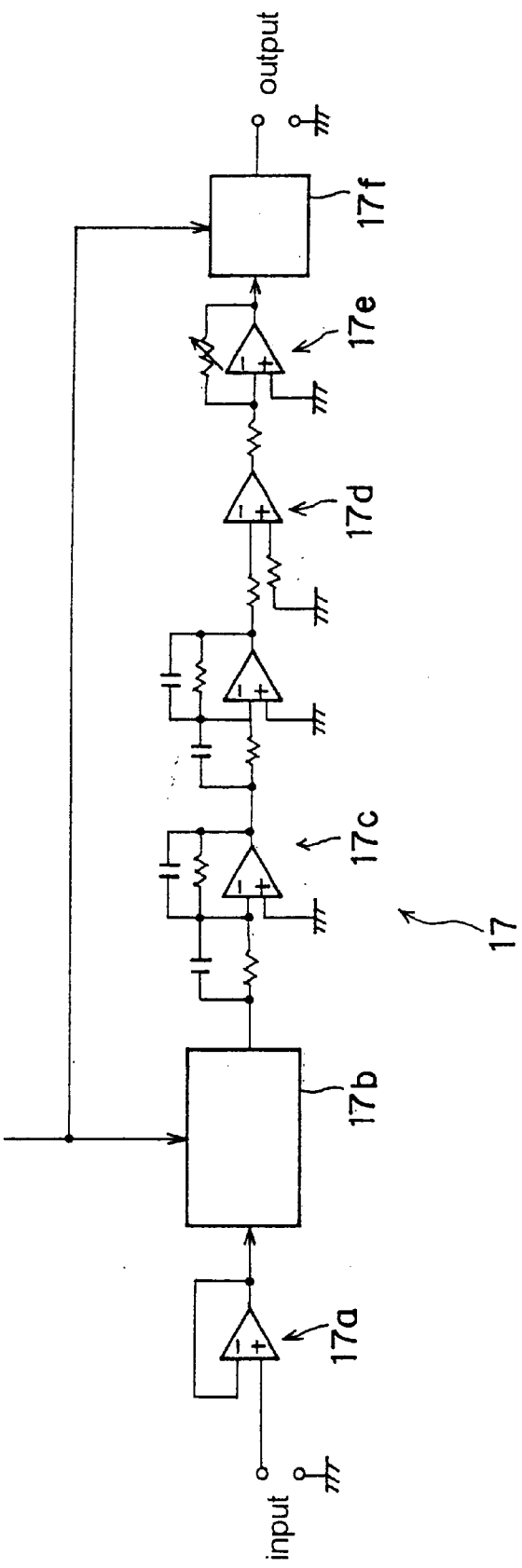
FIG. 27 is a schematic view showing an example of a configuration of a second control unit according to another embodiment of the present invention.

FIG. 27 shows an example of a configuration of the second control unit 17. A sensor signal (input) is amplified by a buffer amplifier 17a, and a component of a signal corresponding to a rotational speed is extracted by a rotational speed signal extractor 17b. The model VT-2BPA of NF Corp., for example, is used as the extractor 17b. At a phase adjustor 17c, an adjustment amount for phase is imparted. The resulting signal is compared with a reference voltage by a comparator 17d, whereby amplitude information is blocked. Only the frequency and phase information corresponding to the rotational speed of the motor is transmitted downstream. Gain adjustors 17e, 17f adjust the gain, and the resulting signal is added to a signal output from the first control unit 5. The sum is fed as a control current to the electromagnets. The gain adjustor 17e is a fixed gain adjustor unrelated to the rotational speed. The gain adjustor 17f is a rotational speed proportional gain adjustor that gives a gain proportional to the rotational speed. The model AD633 of Analog Devices Inc., for example, is used as the gain adjustor 17f.

Figure 28A:
FIGS. 28A through 28C are schematic views showing experimental data on sharp rise/fall, and whirling characteristics of a rotor at a high rotational speed, in a wafer spin dryer using the second control unit shown in FIG. 27.
Figure 28B:
Figure 28C:
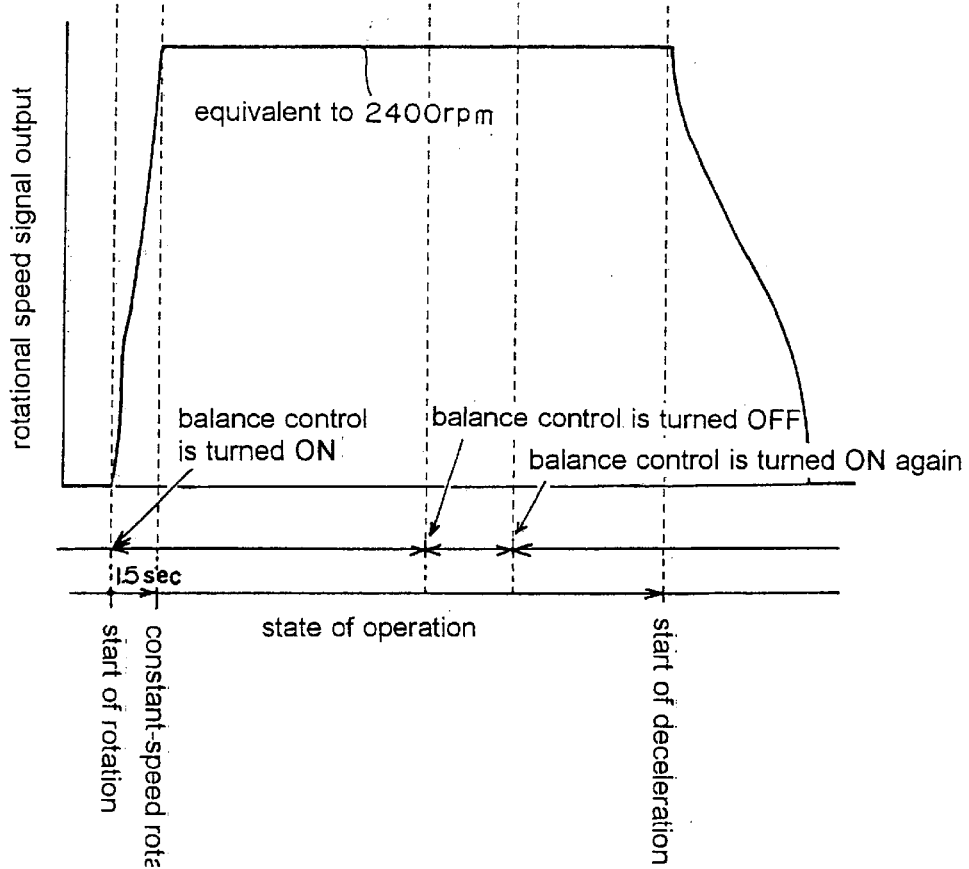

FIGS. 28A through 28C show the situation of whirling of a rotor in a wafer spin dryer which is driven with a sharp rise in rotational speed from zero to a predetermined speed, operated for a certain time at a high speed (predetermined speed) of about 2,400 min$^{-1}$, and then sharply decelerated to a halt. As shown in FIGS. 28A through 28C when a balance control is turned on at the start of rotation, whirling of the rotor has a sufficient margin relative to a touchdown (TD) level even in sharply rising. When the balance control is turned off at high rotational speed, whirling of the rotor increases up to the TD level, as illustrated by outputs from the displacement sensor shown in FIGS. 28A and 28B. Even at a sharp fall, further, the rotation of the rotor is stopped without considerable whirling.

Figure 29A:
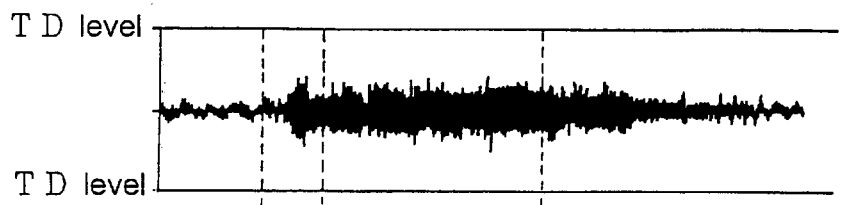
FIGS. 29A through 29C are schematic views showing other experimental data at the time of sharp rise and sharp fall, and whirling characteristics of a rotor at a high rotational speed in a wafer spin dryer using the second control unit shown in FIG. 27.
Figure 29B:
Figure 29C:
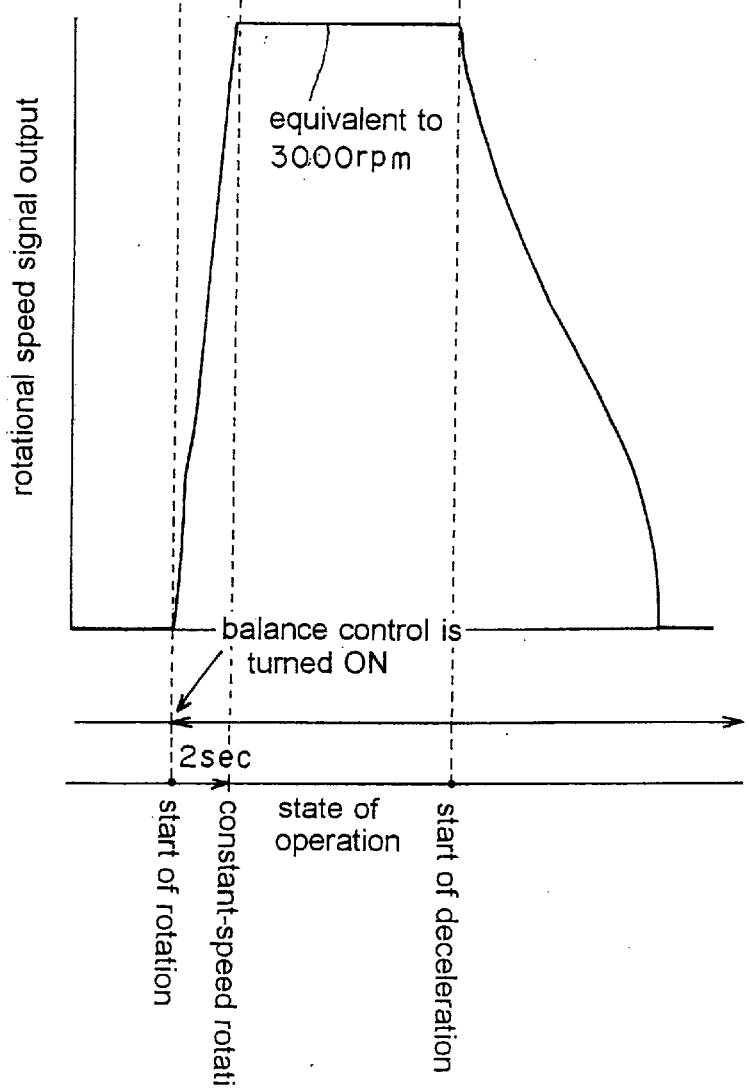

FIGS. 29A through 29C show the situations of whirling of the rotor at the time of sharp rise and sharp fall as in FIGS. 28A through 28C. In this case, the rotational speed was increased up to 3,000 min$^{-1}$. Whirling of the rotor has a sufficient margin relative to the touchdown (TD) level, similarly to the aforementioned case, and hence fully suppressed. In this case, when the balance control is turned off, whirling grows up to the touchdown (TD) level at the sharp rise. By turning on the balance control from the beginning, whirling can be suppressed to a slightly increased degree even at the sharp rise, as shown in the displacement sensor FIG. 29A. The displacement sensor FIG. 29A is a sensor provided in the radial magnetic bearing near the wafer holder. The displacement sensor FIG. 29B is a sensor provided in the radial magnetic bearing distant from the wafer holder.

As described above, the addition of the second control unit to each of the necessary control axes can improve the allowable support characteristics of the magnetic bearing with respect to the following problems:

1) Support for a rotor having an excessive unbalance amount.
2) Support for an external force synchronized with a rotational movement of a motor due to the levitating position of the rotor.
3) Support for a radial external force synchronized with a rotational speed based on the principle of the motor.

Thus, whirling of the rotor can be suppressed.

For example, if the motor is a bipolar induction motor, a radial external force synchronized with the rotational speed is produced. In this case, with a rotating machine for generating a fluid power by a rotational movement of a fan or a pump or the like, an input electric power into the motor increases for maintaining a rotational movement following load fluctuation, whereby a more excessive radial external force is produced. A rolling bearing or a sliding bearing can support the rotor, even though there is a decrease in life. However, there are not a few cases where a contact bearing cannot be used. If a magnetic bearing is applied to a rotary machine for a special environment, then the above problems may occur. A spin dryer which dries a wafer or the like by high-speed rotation may have an excessive unbalance amount due to an object to be dried, compared with an ordinary magnetic bearing supporting stiffness.

Apart from the supporting stiffness of a conventional rolling bearing or sliding bearing, with a spin dryer for a semiconductor device which processes wafers in batch process (25×n wafers), a magnetic bearing may be desired to be used. In this case, the aforementioned problems may arise as well. When a magnetic bearing for non-contact support may need to be used at a portion where a conventional rolling bearing or the like has been used, it is difficult to incorporate a magnetic bearing of a necessary and sufficient size, because the entire space, the space for the bearing, and the structure of the rotor have already been fixed. On the other hand, according to the present invention, there is provided a method which can solve such problems, and broaden the limiting performance of a magnetic bearing.

As described above, according to the present invention, whirling of a rotor supported by a magnetic bearing and having an excessive unbalance amount can be suppressed based on only a signal from a displacement sensor used for levitating position control of the rotor.

Further, the present invention can be applied to other cases in addition to a disturbance synchronized with a rotational speed. The present invention is effective as a means for enhancing a stiffness of a magnetic bearing relative to a periodical disturbance.

INDUSTRIAL APPLICABILITY

The present invention relates to a controller for a magnetic bearing in an apparatus using the magnetic bearing as a means for supporting a rotor. Therefore, the present invention can be utilized for a controller of a magnetic bearing which magnetically levitates and supports a rotating shaft of a magnetically levitated spin dryer used in a semiconductor fabrication device, for example.

I claim:

1. A controlled magnetic bearing apparatus for radially supporting a rotor, comprising a displacement sensor for detecting a radial displacement of said rotor, a first control unit for calculating a first control signal based on a sensor signal from said displacement sensor and outputting said first control signal, a power amplifier for supplying an electric current based on said first control signal, and an electromagnet for generating a magnetic force based on said electric current from said power amplifier, said controlled magnetic bearing apparatus further comprising:

a second control unit disposed in parallel with said first control unit for generating a second control signal changed in phase from said sensor signal inputted therein and outputting said second control signal;

a signal synthesizer for adding said second control signal outputted from said second control unit to said first control signal outputted from said first control unit to generate a control signal and outputting said control signal to said power amplifier; and means for changing a phase amount in said second control unit to a value suitable for suppressing movement of said rotor, based on external force/displacement transfer characteristics of a magnetic bearing.

2. A controlled magnetic bearing apparatus according to claim 1, characterized in that:

said second control unit comprises:
a filter for extracting a rotational frequency component from said sensor signal;
a phase adjustor for adjusting a phase of an output signal from said filter;
a signal generator including a comparator for comparing an output signal from said phase adjustor with a reference electric potential; and
a gain adjustor for adjusting an amplitude of an output signal from said signal generator.

3. A controlled magnetic bearing apparatus according to claim 2, characterized in that:

a rotational speed proportional gain adjustor for giving a gain proportional to a rotational speed is used as said gain adjustor.

4. A controlled magnetic bearing apparatus according to claim 2, characterized in that:

a second rotational frequency component extractor is provided at the downstream side of a signal generator including a comparator in said second control unit.

5. A controlled magnetic bearing apparatus according to claim 1, characterized in that:

said second control unit comprises:
a variable frequency filter; and
means for impairing a phase change amount corresponding to a rotational speed of a motor and suitable for suppressing whirling of said rotor.

6. A controlled magnetic bearing apparatus according to claim 5, characterized in that:

said means for imparting a phase change amount corresponding to a rotational speed of a motor and suitable for suppressing whirling of said rotor comprises:
a storage for measuring data on external force/ displacement transfer characteristics of a magnetic bearing, and storing said measured data in correspondence with a rotational speed; and
a phase adjustor for reading from said storage and adjusting said phase.

7. A controlled magnetic bearing apparatus according to claim 5, characterized in that:

said phase change amount corresponding to said rotational speed of said motor is set with use of an arithmetic circuit which approximates a external force/ displacement transfer characteristics of said magnetic bearing.

8. A controlled magnetic bearing apparatus according to claim 1, further comprising:

a signal switch for switching on and off a flow of a signal in said second control unit; and
a third control unit for comparing said sensor signal with a reference signal, and turning said signal switch on or off based on results of comparison.

9. A controlled magnetic bearing apparatus according to according to claim 1, further comprising:

a signal switch for switching on and off a flow of a signal in said second control unit; and
a fourth control unit including a comparator for comparing an actual rotational speed signal with a reference signal, and a signal generator for generating a command signal for turning said signal switch on or off.

10. A controlled magnetic bearing apparatus according to claim 8 or 9, comprising:

a fifth control unit for comparing said sensor output before said signal switch in said second control unit is turned on, with said sensor output at the time when said signal switch is turned on, and outputting a command value for changing a set value of a gain in said gain adjustor.

11. A controlled magnetic bearing apparatus according to claim 1, wherein said means for changing a phase amount in said second control unit is adapted to change a phase amount to a value suitable for suppressing whirling or periodical movement of said rotor.

* * * * *